(12) United States Patent
Katagiri

(10) Patent No.: US 12,554,436 B2
(45) Date of Patent: Feb. 17, 2026

(54) MEMORY SYSTEM

(71) Applicant: Kioxia Corporation, Tokyo (JP)

(72) Inventor: Toru Katagiri, Sagamihara Kanagawa (JP)

(73) Assignee: Kioxia Corporation, Tokyo (JP)

( * ) Notice: Subject to any disclaimer, the term of this patent is extended or adjusted under 35 U.S.C. 154(b) by 215 days.

(21) Appl. No.: 18/466,413

(22) Filed: Sep. 13, 2023

(65) Prior Publication Data

US 2024/0094946 A1 Mar. 21, 2024

(30) Foreign Application Priority Data

Sep. 20, 2022 (JP) ................................ 2022-149248

(51) Int. Cl.
 *G06F 3/06* (2006.01)
(52) U.S. Cl.
 CPC .......... *G06F 3/0656* (2013.01); *G06F 3/0607* (2013.01); *G06F 3/0658* (2013.01); *G06F 3/0679* (2013.01)
(58) Field of Classification Search
 CPC .... G06F 3/0656; G06F 3/0607; G06F 3/0658; G06F 3/0679
 See application file for complete search history.

(56) References Cited

U.S. PATENT DOCUMENTS

| 2016/0188208 | A1 | 6/2016 | Kim et al. | |
| 2019/0235762 | A1* | 8/2019 | Kaburaki | G06F 12/0864 |
| 2020/0142630 | A1* | 5/2020 | Lee | G06F 12/1009 |
| 2020/0293676 | A1* | 9/2020 | Hara | G06F 21/79 |
| 2021/0064520 | A1* | 3/2021 | Kanno | G11C 16/08 |
| 2021/0073404 | A1* | 3/2021 | Sakata | G06F 3/0623 |
| 2021/0294738 | A1 | 9/2021 | Tadokoro | |
| 2023/0205449 | A1* | 6/2023 | Jeong | G06F 12/0246 711/118 |
| 2024/0086071 | A1* | 3/2024 | Gorrle | G06F 3/0629 |

OTHER PUBLICATIONS

Kim, Kyusik, Eunji Lee, and Taeseok Kim. "HMB-SSD: Framework for efficient exploiting of the host memory buffer in the NVMe SSD." IEEE Access 7 (2019): 150403-150411. (Year: 2019).*
Goossens, Sven, et al. "Power/performance trade-offs in real-time SDRAM command scheduling." IEEE Transactions on Computers 65.6 (2015): 1882-1895. (Year: 2015).*

* cited by examiner

*Primary Examiner* — Nicholas J Simonetti
(74) *Attorney, Agent, or Firm* — Foley & Lardner LLP

(57) ABSTRACT

According to one embodiment, a controller of a memory system receives, from a host, a first read command that specifies a first logical address and a data pointer, the first logical address corresponding to first data stored in the nonvolatile memory, the data pointer indicating a first data buffer of a memory of the host to which the first data is to be transferred. The controller performs read access to the first data buffer of the memory of the host, based on the data pointer specified by the first read command.

17 Claims, 15 Drawing Sheets

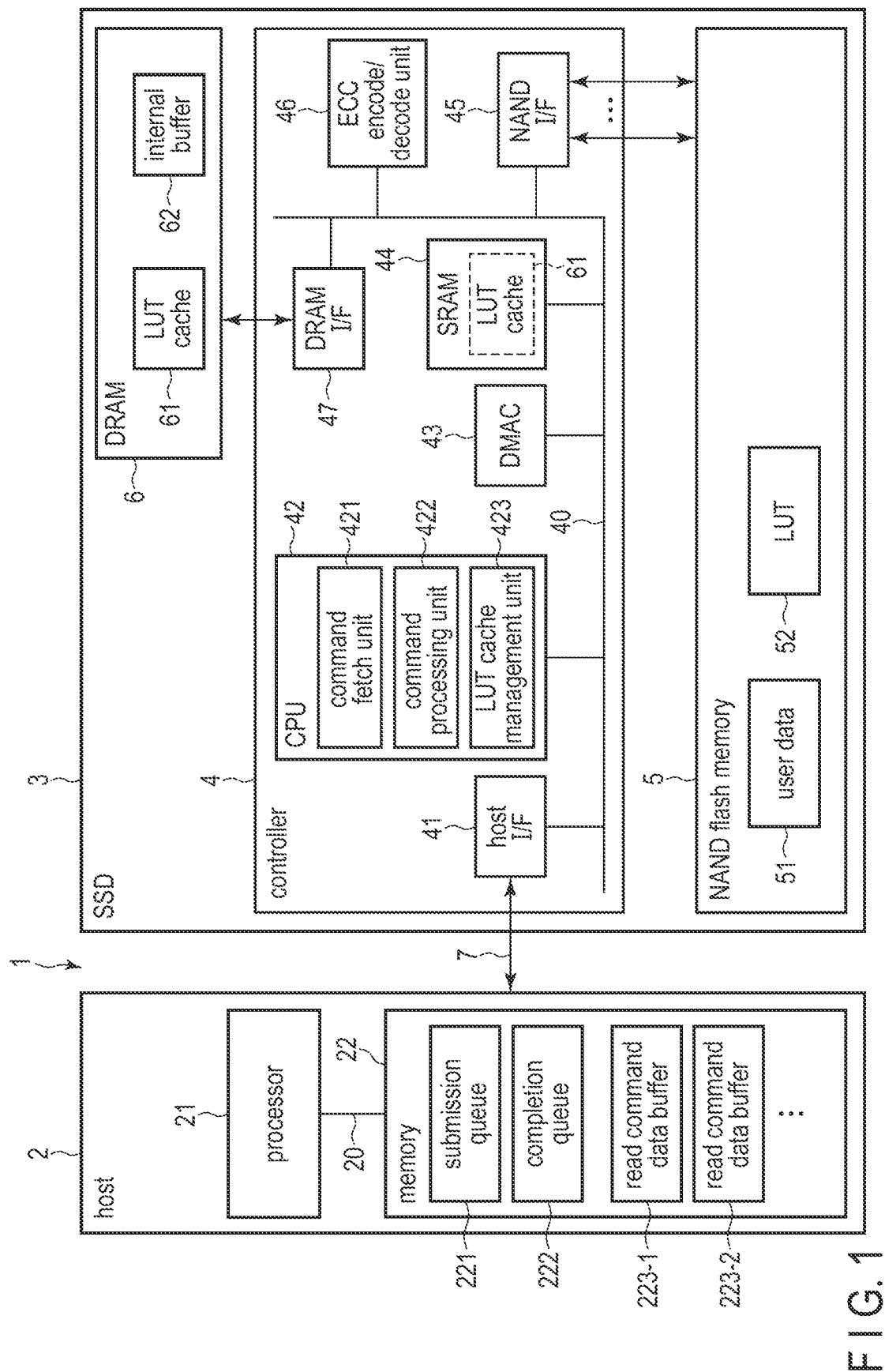
F I G. 1

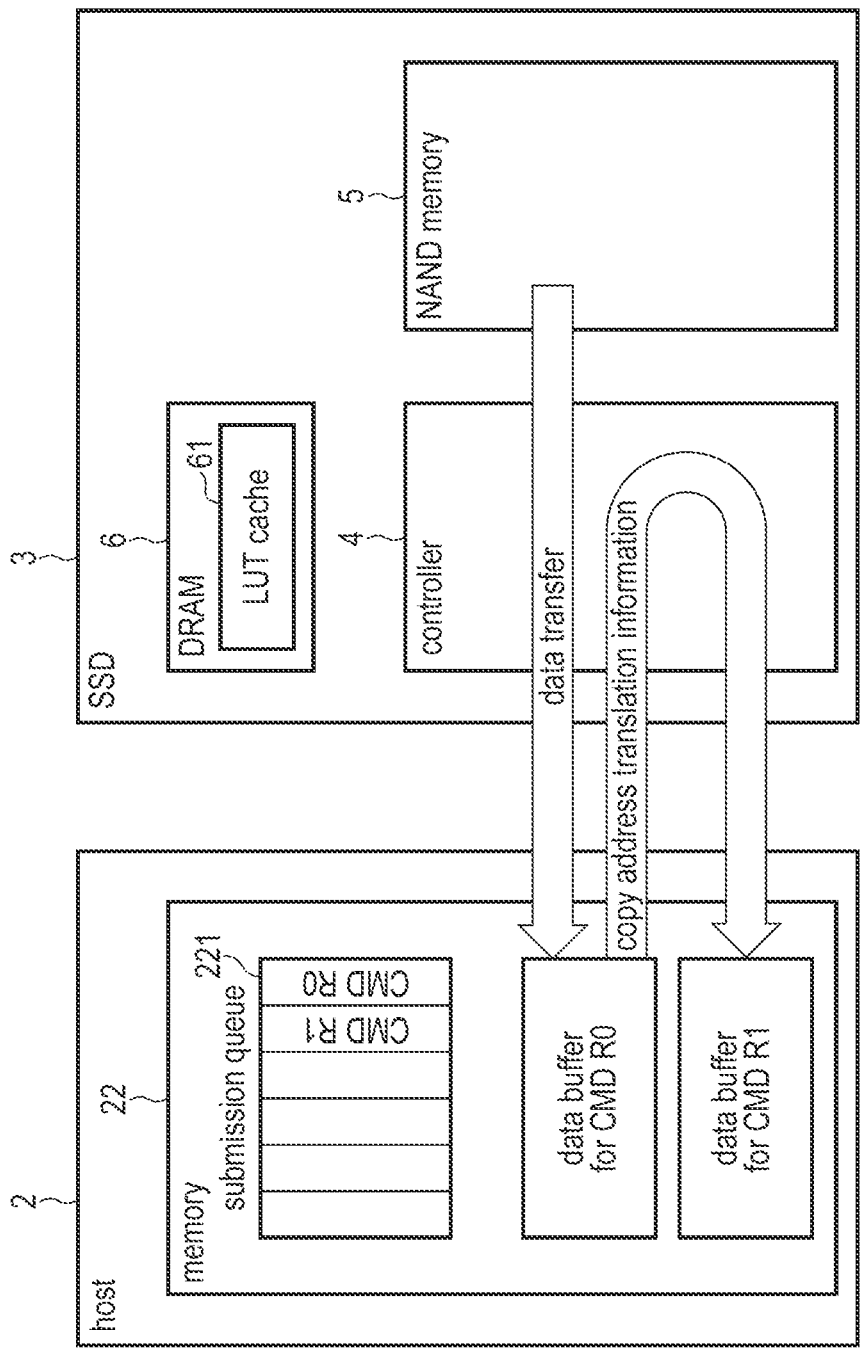
F I G. 10

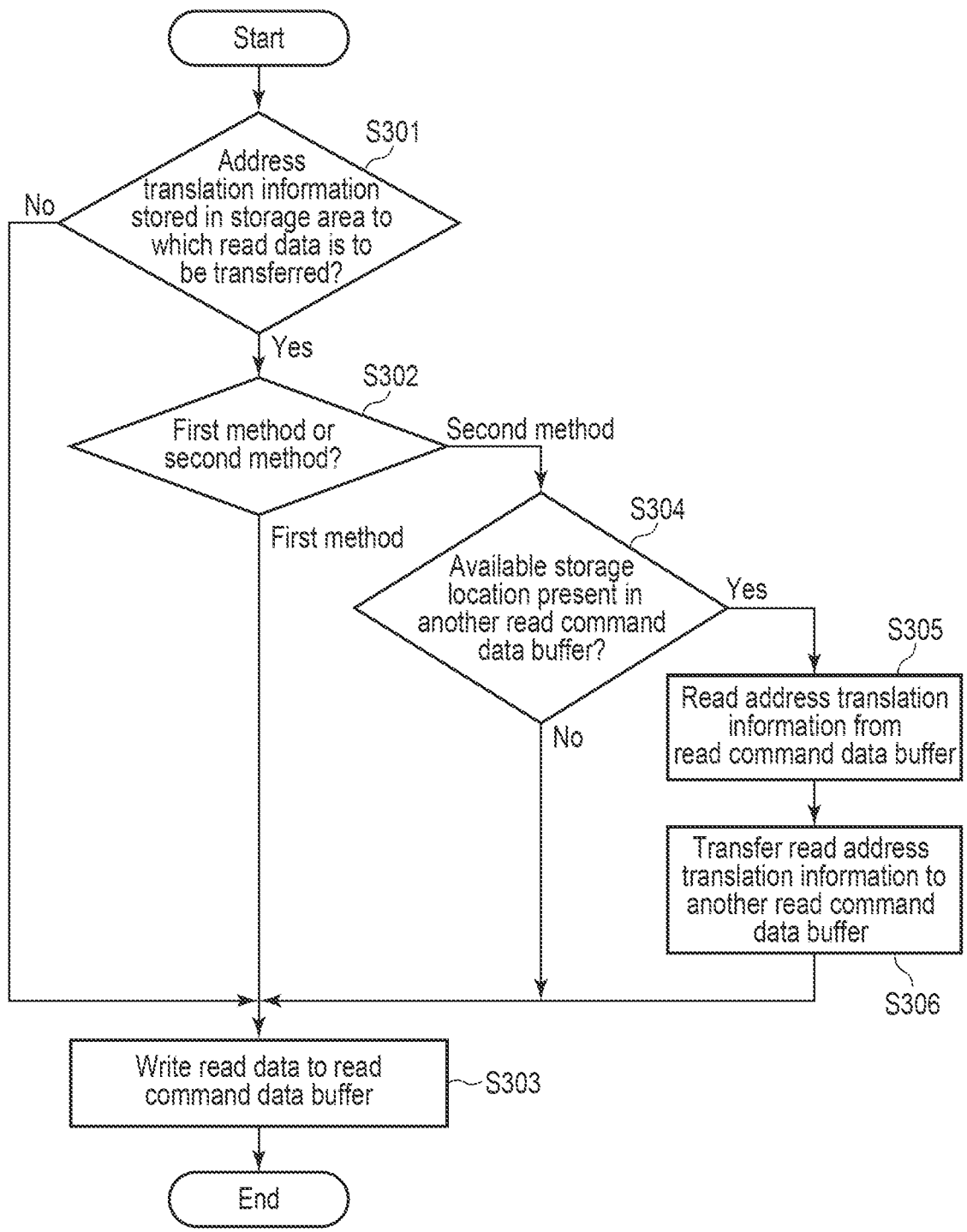
F I G. 15

US 12,554,436 B2

MEMORY SYSTEM

CROSS-REFERENCE TO RELATED APPLICATIONS

This application is based upon and claims the benefit of priority from Japanese Patent Application No. 2022-149248, filed Sep. 20, 2022, the entire contents of which are incorporated herein by reference.

FIELD

Embodiments described herein relate generally to a technique for controlling a nonvolatile memory.

BACKGROUND

In recent years, memory systems including nonvolatile memories are widely used. As one of such memory systems, a solid state drive (SSD) that includes a NAND flash memory is known.

The SSD may comprise a volatile memory in which speed of data writing and speed of data reading are faster than those in a nonvolatile memory. A controller of the SSD causes the volatile memory to temporarily store data read from the nonvolatile memory. This allows the controller to read the data from the volatile memory faster than a case where the data is read again from the nonvolatile memory. Thus, when a volatile memory having a large capacity is provided, the generation of extra latency is prevented. However, the increase in the capacity of the volatile memory of the SSD affects the cost and size of the SSD.

Therefore, SSDs require a technique which can effectively use a memory of a host.

BRIEF DESCRIPTION OF THE DRAWINGS

FIG. 1 is a block diagram illustrating an example of a configuration of an information processing system that includes a memory system according to an embodiment.

FIG. 10 is a diagram illustrating an overwrite process and a copy process of address translation information executed in the memory system according to the embodiment.

FIG. 15 is a flowchart illustrating the procedure of a process of data transfer executed in the memory system according to the embodiment.

DETAILED DESCRIPTION

Figure 2:
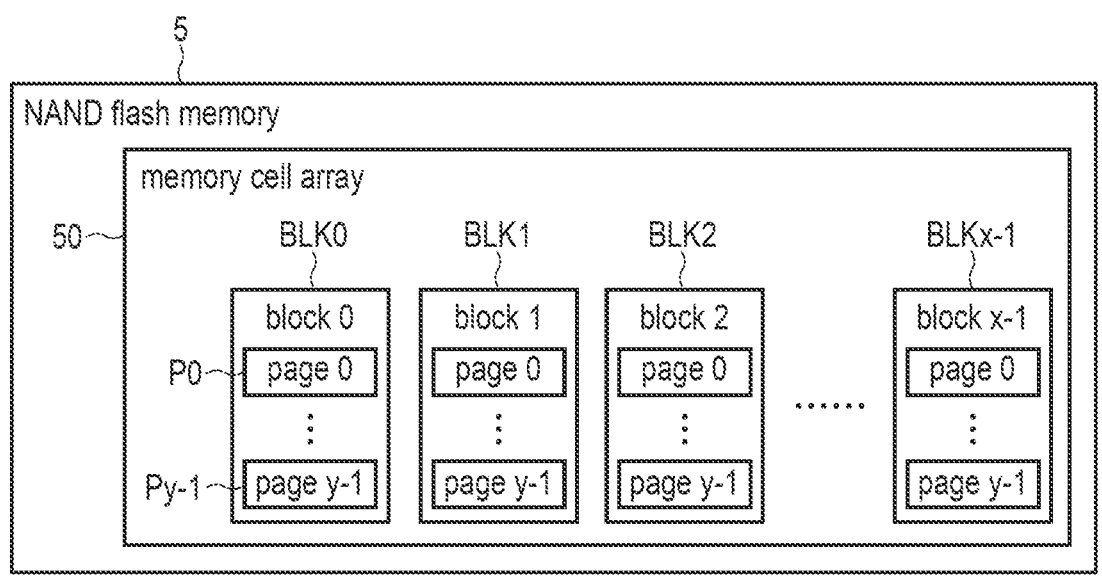
FIG. 2 is a block diagram illustrating an example of a configuration of a NAND flash memory of the memory system according to the embodiment.

In general, according to one embodiment, a memory system is connectable to a host. The memory system comprises a nonvolatile memory, and a controller that is electrically connected to the nonvolatile memory and configured to control the nonvolatile memory. The controller receives, from the host, a first read command that specifies a first logical address and a data pointer, the first logical address corresponding to first data stored in the nonvolatile memory, the data pointer indicating a first data buffer of a memory of the host to which the first data is to be transferred. The controller performs read access to the first data buffer of the memory of the host, based on the data pointer specified by the first read command.

Various embodiments will be described hereinafter with reference to the accompanying drawings.

In the following explanation, it is assumed that the memory system of an embodiment is realized as an SSD. FIG. 1 is a block diagram illustrating an example of a configuration of an information processing system 1 that includes the memory system according to the embodiment. The information processing system 1 includes a host 2 and an SSD 3. The host 2 and the SSD 3 are connectable to each other through a bus 7.

The host 2 is an information processing device. The host 2 is, for example, a personal computer, a server computer or a mobile terminal. The host 2 accesses the SSD 3. Specifically, the host 2 transmits, to the SSD 3, a write command which is a command to write data. The host 2 transmits, to the SSD 3, a read command which is a command to read data. The host 2 transmits, to the SSD 3, an invalidation command which is a command to invalidate data. For example, the invalidation command is an unmap command or a trim command.

The host 2 includes a processor 21 and a memory 22. The processor 21 and the memory 22 are mutually connected through an internal bus 20.

The SSD 3 is a storage device which is connectable to the host 2. The SSD 3 includes a nonvolatile memory. The SSD 3 writes data to the nonvolatile memory. In addition, the SSD 3 reads data from the nonvolatile memory.

Communication between the SSD 3 and the host 2 is executed through the bus 7. The bus 7 is a communication path that connects the host 2 and the SSD 3. The bus 7 is, for example, a PCI Express™ (PCIe™) bus. The PCIe bus includes both a communication path for transmitting data and an input/output (I/O) command from the host 2 to the SSD 3 and a communication path for transmitting data and a response from the SSD 3 to the host 2. The I/O command is a command for writing data to the nonvolatile memory or reading data from the nonvolatile memory. The I/O command is, for example, a write command or a read command.

For the specification of the logical interface for connecting the host 2 and the SSD 3, for example, the NVM Express™ (NVMe™) standard may be used. In the interface of the NVMe standard, the communication between the host 2 and the SSD 3 is performed by using a pair of queues including at least one submission queue (SQ) and a completion queue (CQ) that is associated with the submission queue (SQ). This pair of queues is called a submission/completion queue pair (SQ/CQ pair). In the issuance of a command from the host 2 to the SSD 3, a submission queue (SQ) is used. In the transmission of a completion response from the SSD 3 to the host 2, a completion queue (CQ) is used. The transferring of commands, data, and completion responses between the host 2 and the SSD 3 is performed through the bus 7.

Next, the configuration of the host 2 will be described.

The processor 21 is, for example, a central processing unit (CPU). The processor 21 executes software (host software) loaded from the SSD 3 or another storage device connected to the host 2 into the memory 22. The host software includes, for example, an operating system (OS) and an application program. The processor 21 executes communication with the SSD 3 through the bus 7.

The memory 22 is, for example, a volatile memory. The memory 22 is also called a main memory, a system memory or a host memory. The memory 22 is, for example, a dynamic random access memory (DRAM). A part of the storage area of the memory 22 is used to store an SQ/CQ pair.

The SQ/CQ pair is used in the communication between the host 2 and the SSD 3. The SQ/CQ pair includes a submission queue (SQ) 221 and a completion queue (CQ) 222.

The SQ 221 is a queue which is used to issue a command to the SSD 3. The SQ 221 includes a plurality of slots each of which can store a command. The CQ 222 is a queue which is used to receive, from the SSD 3, a completion response indicating the completion of a command. The completion response includes information indicating the status (success or failure, etc.,) of the completed command. The completion response is also called command completion or command completion notice. The CQ 222 includes a plurality of slots each of which can store a completion response.

Parts of the storage area of the memory 22 are used as read command data buffers 223-1, 223-2, . . . One read command data buffer 223 is associated with one read command. Each read command data buffer 223 is a storage area to which read target data requested to be read by a corresponding read command to be transferred. When a read command is issued to the SSD 3, the processor 21 allocates a read command data buffer 223-1 in the memory 22 and stores the read command in the submission queue (SQ) 221. The size of the allocated read command data buffer 223-1 is determined on the basis of the size of read target data specified by the read command stored in the SQ 221. The read command specifies a logical address corresponding to the read target data, the size of the read target data, and a data pointer indicating the read command data buffer 223-1. The data pointer is a memory address indicating the storage area in the memory 22 allocated as the read command data buffer 223-1. When another read command is issued to the SSD 3, the processor 21 allocates a read command data buffer 223-2 in the memory 22 and stores the other read command in the submission queue (SQ) 221. The size of the allocated read command data buffer 223-2 is determined on the basis of the size of read target data specified by the other read command. This other read command specifies a logical address corresponding to the read target data, the size of the read target data, and a data pointer indicating the read command data buffer 223-2.

The processor 21 stores data to be written to the SSD 3 in the storage area on the memory 22 and stores a write command in the submission queue (SQ) 221. The write command includes information specifying a logical address to which the data stored in the memory 22 to be written, a data pointer indicating the storage area in which the data is stored in the memory 22, and the size of the data.

Next, the internal configuration of the SSD 3 will be described. The SSD 3 includes a controller 4 and a NAND flash memory 5. Hereinafter, the NAND flash memory 5 is called a NAND memory 5. The SSD 3 may further include a random access memory, for example, a dynamic random access memory (DRAM) 6.

The controller 4 is a memory controller. The controller 4 is, for example, a control circuit such as a system-on-a-chip (SoC). The controller 4 is electrically connected to the NAND memory 5. The controller 4 executes a data write operation for writing data to the NAND memory 5 and a data read operation for reading data from the NAND memory 5. The controller 4 also executes communication with the host 2 through the bus 7. For the physical interface which connects the controller 4 and the NAND memory 5, for example, a Toggle NAND flash interface or an open NAND flash interface (ONFI) is used. The function of each unit of the controller 4 may be realized by dedicated hardware, a processor which executes a program, or a combination thereof.

The NAND memory 5 is a nonvolatile memory. The NAND memory 5 includes a plurality of memory cells arranged in matrix. The NAND memory 5 may be either a flash memory having a two-dimensional structure or a flash memory having a three-dimensional structure.

The DRAM 6 is a volatile memory. A part of the storage area of the DRAM 6 is used as a storage area for temporarily storing data. The DRAM 6 may store management data. The management data is data used to manage the SSD 3.

Next, the internal configuration of the controller 4 will be explained. The controller 4 includes a host interface (host I/F) 41, a CPU 42, a direct memory access controller (DMAC) 43, a static RAM (SRAM) 44, a NAND interface (NAND I/F) 45, an ECC encode/decode unit 46, and a DRAM interface (DRAM I/F) 47. These host interface 41, CPU 42, DMAC 43, SRAM 44, NAND interface 45, ECC encode/decode unit 46, and DRAM interface 47 are mutually connected through a bus 40.

The host interface 41 is a communication interface circuit. The host interface 41 executes communication with the host 2. The host interface 41 is, for example, a PCIe controller.

The host interface 41 includes an arbitration mechanism. The arbitration mechanism is a mechanism which selects a submission queue from which a command to be fetched from the submission queues of the host 2. The arbitration mechanism is, for example, a round robin arbitration mechanism or a weighted round robin arbitration mechanism.

The CPU 42 is a processor. The CPU 42 controls the host interface 41, the DMAC 43, the SRAM 44, the NAND interface 45, the ECC encode/decode unit 46, and the DRAM interface 47. The CPU 42 performs various processes by loading a control program (firmware) stored in the NAND memory 5 or a ROM (not shown) into the SRAM 44 and executing the firmware. The firmware may be loaded into the DRAM 6.

For example, the CPU 42 performs management of data stored in the NAND memory 5 and management of blocks included in the NAND memory 5 as a flash translation layer (FTL). The management of data stored in the NAND memory 5 includes, for example, management of mapping information which is information indicating correspondences between each logical address and each physical address of the NAND memory 5. The logical address is an address which is used by the host 2 to access the NAND memory 5. The logical address is, for example, a logical block address (LBA). The physical address of the NAND memory 5 is an address indicating a physical storage location included in the NAND memory 5. The CPU 42 manages mapping between each logical address and each physical address by using an LUT cache 61. The management of blocks included in the NAND memory 5 includes management of defective blocks included in the NAND memory 5, wear leveling and garbage collection.

The DMAC 43 is a circuit which executes direct memory access (DMA). The DMAC 43 executes data transfer between the memory 22 of the host 2 and the SRAM 44 or the DRAM 6. When data is transferred from the controller 4 to the memory 22 of the host 2, the DMAC 43 transmits a memory write request to the host 2 and writes the data to the memory 22. The memory write request includes a memory address indicating a storage location in the memory 22 to which the data to be transferred. When data is transferred from the memory 22 of the host 2 to the controller 4, the DMAC 43 transmits a memory read request to the host 2 and reads the data from the memory 22. The memory read request includes a memory address indicating a storage location in the memory 22 in which the data is stored.

The SRAM 44 is a volatile memory. The SRAM 44 is also used as a storage area for temporarily storing data in the same manner as the DRAM 6.

The NAND interface 45 is a circuit which controls the NAND memory 5. When the NAND memory 5 consists of a plurality of NAND flash memory dies, the NAND interface 45 may be connected to the NAND flash memory dies through a plurality of channels.

The ECC encode/decode unit 46 is a circuit which executes encoding data and decoding data. The ECC encode/decode unit 46 executes an encoding process when data is to be written to the NAND memory 5. In the encoding process, the ECC encode/decode unit 46 adds an error correction code (ECC) as a redundancy code to the data to be written. The ECC encode/decode unit 46 executes a decoding process when data is read from the NAND memory 5. In the decoding process, by using the ECC added to the data read from the NAND memory 5, the ECC encode/decode unit 46 executes an error correction process of the data.

The DRAM interface 47 is a circuit which controls the DRAM 6. The DRAM interface 47 stores data in the DRAM 6 and reads data stored in the DRAM 6.

Next, data stored in the NAND memory 5 will be described. The NAND memory 5 stores user data 51 and a lookup table (LUT) 52.

The user data 51 is data written to the NAND memory 5 on the basis of a write command received from the host 2. The user data stored in the NAND memory 5 is roughly classified into valid data and invalid data. The valid data is data stored in a storage location in the NAND memory 5 indicated by a physical address associated with a logical address. The valid data is data to possibly be read by the host 2 later. The invalid data is data stored in a storage location in the NAND memory 5 indicated by a physical address which is not associated with a logical address. The invalid data is data not to be read by the host 2 anymore.

The LUT 52 stores mapping information indicating a correspondence between each logical addresses and each physical addresses of the NAND memory 5. The LUT 52 is also called a logical-to-physical translation table (L2P table). The LUT 52 stores address translation information for translating a logical address into a corresponding physical address. Data stored in a storage location indicated by a physical address referred to in the LUT 52 is valid data. Data stored in a storage location indicated by a physical address which is not referred to in the LUT 52 is invalid data.

Next, an internal configuration example of the DRAM 6 will be explained. A part of the storage area of the DRAM 6 is used as the LUT cache 61. Another part of the storage area of the DRAM 6 is used as an internal buffer 62.

The LUT cache 61 is a storage area for temporarily storing part of the address translation information that is stored in the LUT 52 in the NAND memory 5. The LUT cache 61 may be stored in the SRAM 44 of the controller 4 instead of the DRAM 6. The LUT cache 61 has a plurality of entries each of which can store one or more pieces of address translation information. The address translation information stored in each of the entries includes, for example, a plurality of physical addresses that correspond to consecutive logical addresses, respectively. The LUT cache 61 stores a dirty flag for each piece of address translation information stored in the LUT cache 61. The dirty flag is a flag indicating whether or not a piece of corresponding address translation information is information which needs to be written back to the LUT 52. The address translation information which needs to be written back to the LUT 52 is address translation information which is updated while it is stored in the LUT cache 61 and is not reflected on the LUT 52 in the NAND memory 5. Hereinafter, the address translation information which needs to be written back to the LUT 52 is called dirty address translation information.

The internal buffer 62 is a storage area in which user data is temporarily stored. The internal buffer 62 temporarily stores data associated with a write command received from the host 2. The internal buffer 62 temporarily stores data that has been read from the NAND memory 5 based on a read command received from the host 2.

Next, a functional configuration example of the CPU 42 will be explained. The CPU 42 includes a command fetch unit 421, a command processing unit 422 and an LUT cache management unit 423. Each of the command fetch unit 421, the command processing unit 422 and the LUT cache management unit 423 may be partially or entirely realized by dedicated hardware of the controller 4. For example, the command fetch unit 421 may be realized by the host interface 41.

The command fetch unit 421 fetches at least one I/O command from the submission queue (SQ) 221 of the host 2 through the host interface 41. This causes the controller 4 to receive the I/O command from the host 2.

The command processing unit 422 interprets (decodes) the fetched I/O command and executes a command process corresponding to the I/O command. The command process corresponding to the I/O command is, for example, a process of writing data to the NAND memory 5 or a process of reading data from the NAND memory 5. Specifically, the command processing unit 422 instructs the NAND memory

5 to execute a data write operation or data read operation corresponding to the I/O command. The instruction of the data write operation or the data read operation for the NAND memory 5 is transmitted to the NAND memory 5 through the NAND interface 45.

For example, when the I/O command received from the host 2 is a read command, the command processing unit 422 executes an address translation process for translating a logical address specified by the read command (a logical address corresponding to read target data) into a physical address. The command processing unit 422 obtains address translation information corresponding to this logical address from the LUT cache 61 through the LUT cache management unit 423. The command processing unit 422 executes the address translation process by using the obtained address translation information. The command processing unit 422 executes a command process for reading, from the NAND memory 5, the read target data stored in a storage location in the NAND memory 5 indicated by the obtained physical address. The read target data which has been read from the NAND memory 5 is temporarily stored in the internal buffer 62. Then, the command processing unit 422 transfers the read target data stored in the internal buffer 62 to the read command data buffer 223. A data pointer specified by the read command indicates the read command data buffer 223. In a process of transferring the read target data to the read command data buffer 223, the command processing unit 422 writes the read target data to the read command data buffer 223 by transmitting a memory write request to the host 2.

The command processing unit 422 then transmits a completion response indicating the completion of the read command to the host 2 through the host interface 41. In this case, the command processing unit 422 stores the completion response in the completion queue (CQ) 222 associated with the submission queue (SQ) 221 from which this read command was fetched.

The LUT cache management unit 423 manages address translation information stored in the LUT cache 61. In an address translation process, the LUT cache management unit 423 searches for address translation information corresponding to a target logical address of the address translation process. In the process of searching for address translation information, the LUT cache management unit 423 firstly determines whether or not address translation information corresponding to the target logical address is stored in the LUT cache 61.

When address translation information corresponding to the target logical address of the address translation process is stored in the LUT cache 61 (cache hit), the LUT cache management unit 423 reads the address translation information from the LUT cache 61 and transfers the read address translation information to the command processing unit 422.

When address translation information corresponding to the target logical address of the address translation process is not stored in the LUT cache 61 (cache miss), the LUT cache management unit 423 executes a cache refilling process. The cache refilling process includes a process of reading the address translation information from the LUT 52 in the NAND memory 5 and a process of storing the read address translation information in a free entry of the LUT cache 61. The free entry is an entry which is available for storing new address translation information.

When the LUT cache 61 has a free entry, the LUT cache management unit 423 stores the address translation information read from the NAND memory 5 into the free entry. When the LUT cache 61 does not have any free entry, the LUT cache management unit 423 selects eviction target address translation information from the pieces of address translation information stored in the LUT cache 61. For example, the LUT cache management unit 423 selects the address translation information which has been used least recently as the eviction target address translation information by using least recently used (LRU) algorithm. The eviction target address translation information is also called the replacement target address translation information. The LUT cache management unit 423 stores the address translation information, which has been read from the NAND memory 5, into the entry of the LUT cache 61 in which the selected eviction target address translation information is stored. This causes the address translation information of this entry to be replaced by the address translation information read from the NAND memory 5.

When the selected eviction target address translation information is dirty address translation information, the LUT cache management unit 423 firstly executes a write back process. The write back process is a process for reflecting the content of dirty address translation information on the LUT 52 in the NAND memory 5 by writing the dirty address translation information back to the LUT 52 in the NAND memory 5. The LUT cache management unit 423 stores the address translation information, which has been read from the NAND memory 5, in the entry of the LUT cache 61 in which the selected eviction target address translation information is stored. This causes the address translation information of this entry to be replaced by the address translation information read from the NAND memory 5.

To increase the cache hit rate of the LUT cache 61, the LUT cache 61 needs to have a large capacity. However, to realize the large-capacity LUT cache 61, a large-capacity DRAM needs to be provided in the SSD 3 as the DRAM 6. This structure may increase the cost of the SSD 3.

In the present embodiment, the controller 4 uses the read command data buffer which is allocated in the memory 22 of the host 2 as the storage area to which read target data to be transferred as a memory resource for the controller 4. The read command data buffer is originally the storage area which is used to write (transfer) read target data to the memory 22. In the present embodiment, the controller 4 is configured to execute read access to the read command data buffer (for example, read command data buffers 223-1, 223-2, etc.,) of the memory 22 of the host 2 on the basis of a data pointer specified by a read command received from the host 2 and read information from the read command data buffer. This causes the read command data buffer to be available for using as the memory resource for the controller 4.

The information read from the read command data buffer is information which is written to the read command data buffer by the controller 4 after the reception of the read command. This information is data other than the read target data.

Specifically, the read command data buffer is available for a cache area of various types of management data. One of the various type of management data is, for example, address translation information.

The controller 4 executes read access to the read command data buffer before writing the read target data to the read command data buffer.

The read command data buffer can be used as the storage area for temporarily caching various types of information used by the controller 4. Hereinafter, a case where the read command data buffer is used as a cache for storing address translation information will be described as an example.

A process of caching address translation information in the read command data buffer is executed by, for example, writing the eviction target address translation information to the read command data buffer.

In this case, the LUT cache management unit 423 may select the eviction target address translation information from the pieces of address translation information which are not dirty. The LUT cache management unit 423 selects, for example, the address translation information which has been used least recently as the eviction target address translation information, from the pieces of address translation information which are not dirty.

The LUT cache management unit 423 then determines whether or not a read command which is in process is present. The read command which is in process is, for example, a read command in which decoding has been completed but the read target data has not been transferred to the memory 22. When a read command which is in process is present, the LUT cache management unit 423 writes the eviction target address translation information to a read command data buffer 223 corresponding to the read command which is in process. The read command data buffer 223 corresponding to the read command which is in process is the storage area of the memory 22 to which the read target data specified by the read command in process is to be transferred. When two or more read commands are in process, the LUT cache management unit 423 determines a read command data buffer 223 corresponding to one of the two or more read commands in process as the storage area to which the eviction target address translation information is to be written. When there is no read command which is in process, the LUT cache management unit 423 discards the eviction target address translation information.

For example, when address translation information corresponding to a new read command following the read command which is in process is stored in the read command data buffer 223, the LUT cache management unit 423 reads this address translation information from the read command data buffer 223. This causes the LUT cache management unit 423 need not to read the address translation information corresponding to the new read command from the NAND memory 5. The cache hit rate can be increased by using the read command data buffer 223 as part of the LUT cache 61 in the above manner. Thus, the performance of the command process of read commands can be improved.

As the address translation information written to the read command data buffer 223 is limited to address translation information which is not dirty, when the read target data is transferred to the read command data buffer 223, the process of writing address translation information back from the read command data buffer 223 to the NAND memory 5 is unnecessary.

Next, an example of a configuration of the NAND memory 5 will be described. FIG. 2 is a block diagram illustrating an example of a configuration of the NAND flash memory of the memory system according to the embodiment.

A memory cell array 50 of the NAND memory 5 includes a plurality of blocks BLK0 to BLKx-1. Each of the blocks BLK0 to BLKx-1 includes a plurality of pages (here, pages P0 to Py-1). Each of the pages includes, for example, a plurality of memory cells connected to the same word line. Each of the blocks BLK0 to BLKx-1 is a unit of a data erase operation for erasing data. Each of the pages P0 to Py-1 is a unit of a data write operation and a data read operation.

Figure 3:
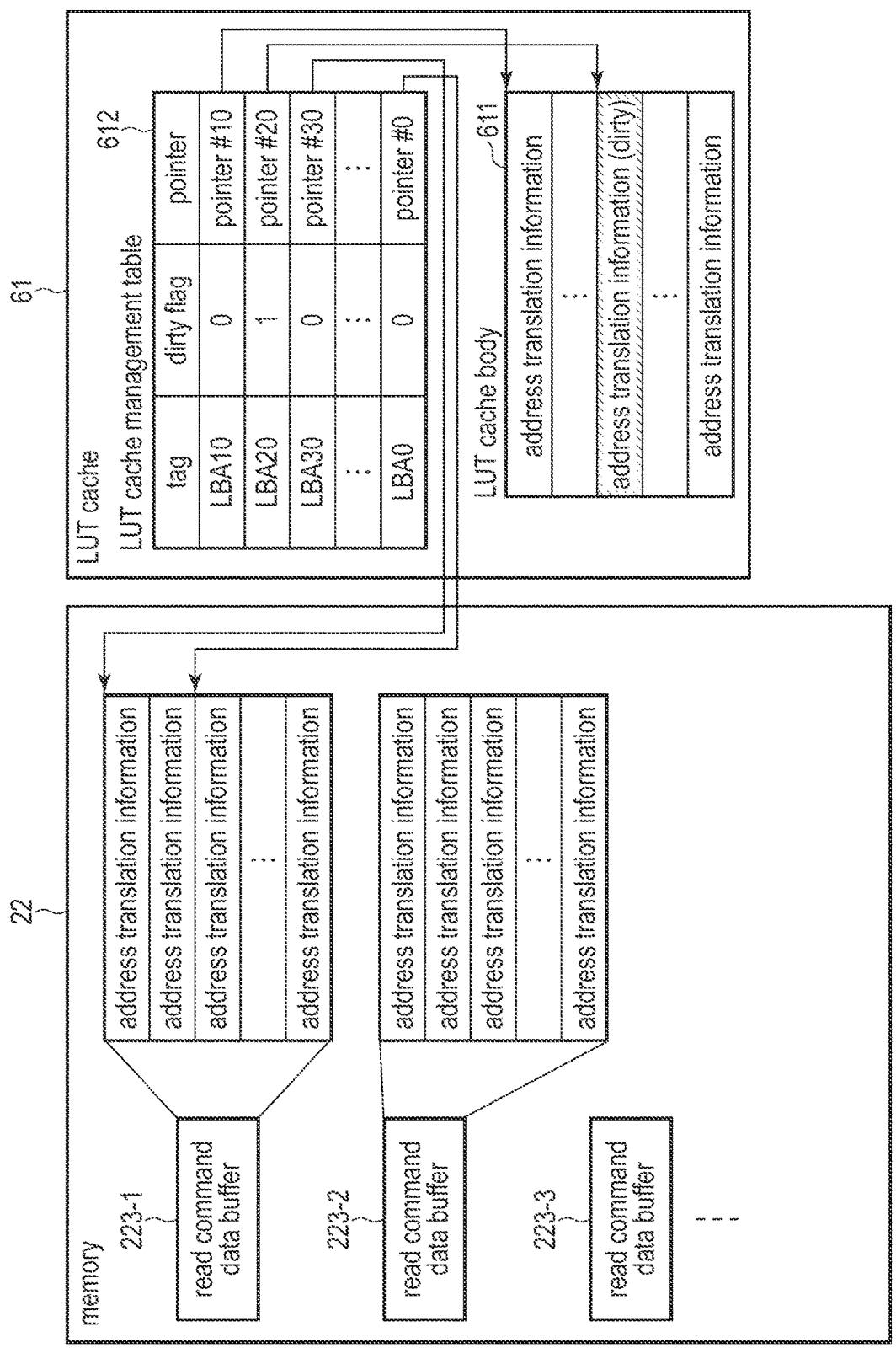
FIG. 3 is a diagram illustrating an example of a configuration of an LUT cache used in the memory system according to the embodiment.

Next, the LUT cache 61 will be described. FIG. 3 is a diagram illustrating an example of a configuration of the LUT cache used in the memory system according to the embodiment.

The LUT cache 61 includes an LUT cache body 611 and an LUT cache management table 612. The LUT cache body 611 includes a plurality of entries (a plurality of cache lines) each of which can store address translation information. The LUT cache management table 612 is a table which stores management information which is necessary for management of address translation information stored in the LUT cache body 611 or the read command data buffer. The LUT cache management table 612 includes more entries than the entries included in the LUT cache body 611. The management information stored in each of the entries of the LUT cache management table 612 corresponds to a piece of address translation information. The management information stored in each of the entries of the LUT cache management table 612 includes, for example, a tag, a dirty flag and a pointer.

The tag is information indicating to which logical address corresponding address translation information corresponds. When address translation information includes a plurality of physical addresses corresponding to a plurality of consecutive logical addresses, respectively, a tag corresponding to this address translation information may indicate the starting logical address of these logical addresses.

The dirty flag is a flag indicating whether or not corresponding address translation information is dirty address translation information. When address translation information includes a plurality of physical addresses corresponding to a plurality of consecutive logical addresses, respectively, a physical address corresponding to one of the logical addresses is updated, and further, the updated physical address has not been reflected on the LUT 52 in the NAND memory 5, this address translation information is handled as dirty address translation information. When corresponding address translation information is dirty address translation information, the dirty flag is set so as to be, for example, the value indicating 1. When corresponding address translation information is not dirty address translation information, the dirty flag is set so as to be, for example, the value indicating 0.

The pointer is information indicating a storage location in which corresponding address translation information is stored. When address translation information is stored in an entry of the LUT cache body 611, the pointer is a memory address indicating the storage location in the DRAM 6 (or the SRAM 44) in which this address translation information is stored. When address translation information is stored in a read command data buffer 223, the pointer is a memory address indicating the storage location in the memory 22 of the host 2 in which this address translation information is stored.

In FIG. 3, the first entry of the LUT cache management table 612 stores information which manages address translation information corresponding to logical addresses LBA10 to LBA19. The dirty flag of the first entry is set so as to be the value indicating 0. Thus, the address translation information corresponding to the first entry is not dirty address translation information. Pointer #10 of the first entry is a memory address indicating a storage location in the DRAM 6 (or the SRAM 44) in which the corresponding address translation information is stored.

The second entry of the LUT cache management table 612 stores information which manages address translation information corresponding to logical addresses LBA20 to LBA29. The dirty flag of the second entry is set so as to be the value indicating 1. Thus, the address translation information corresponding to the second entry is dirty address translation information. Pointer #20 of the second entry is a memory address indicating a storage location in the DRAM 6 (or the SRAM 44) in which the corresponding address translation information is stored.

The third entry of the LUT cache management table 612 stores information which manages address translation information corresponding to logical addresses LBA30 to LBA39. The dirty flag of the third entry is set so as to be the value indicating 0. Thus, the address translation information corresponding to the third entry is not dirty address translation information. Pointer #30 of the third entry is a memory address indicating a storage location in the memory 22 of the host 2 in which corresponding address translation information is stored. For example, when the corresponding address translation information is stored in the starting storage location in a storage area of the memory 22 to which the read command data buffer 223-1 is allocated, pointer #30 is the memory address of this starting storage location.

The last entry of the LUT cache management table 612 stores information which manages address translation information corresponding to logical addresses LBA0 to LBA9. The dirty flag of the last entry is set so as to be the value indicating 0. Thus, the address translation information corresponding to the last entry is not dirty address translation information. Pointer #0 of the last entry is a memory address indicating a storage location of the memory 22 of the host 2 in which the corresponding address translation information is stored. For example, when the corresponding address translation information is stored in the third storage location in the storage area of the memory 22 to which read command data buffer 223-1 is allocated, pointer #0 is the memory address of the third storage location.

Pointer #30 and pointer #0 are memory addresses indicating the storage locations on the memory 22 of the host 2. As the storage capacity of the memory 22 of the host 2 is larger than that of each of the DRAM 6 and the SRAM 44, the sizes of pointer #30 and pointer #0 are greater than those of pointers #10 and #20.

Figure 4:
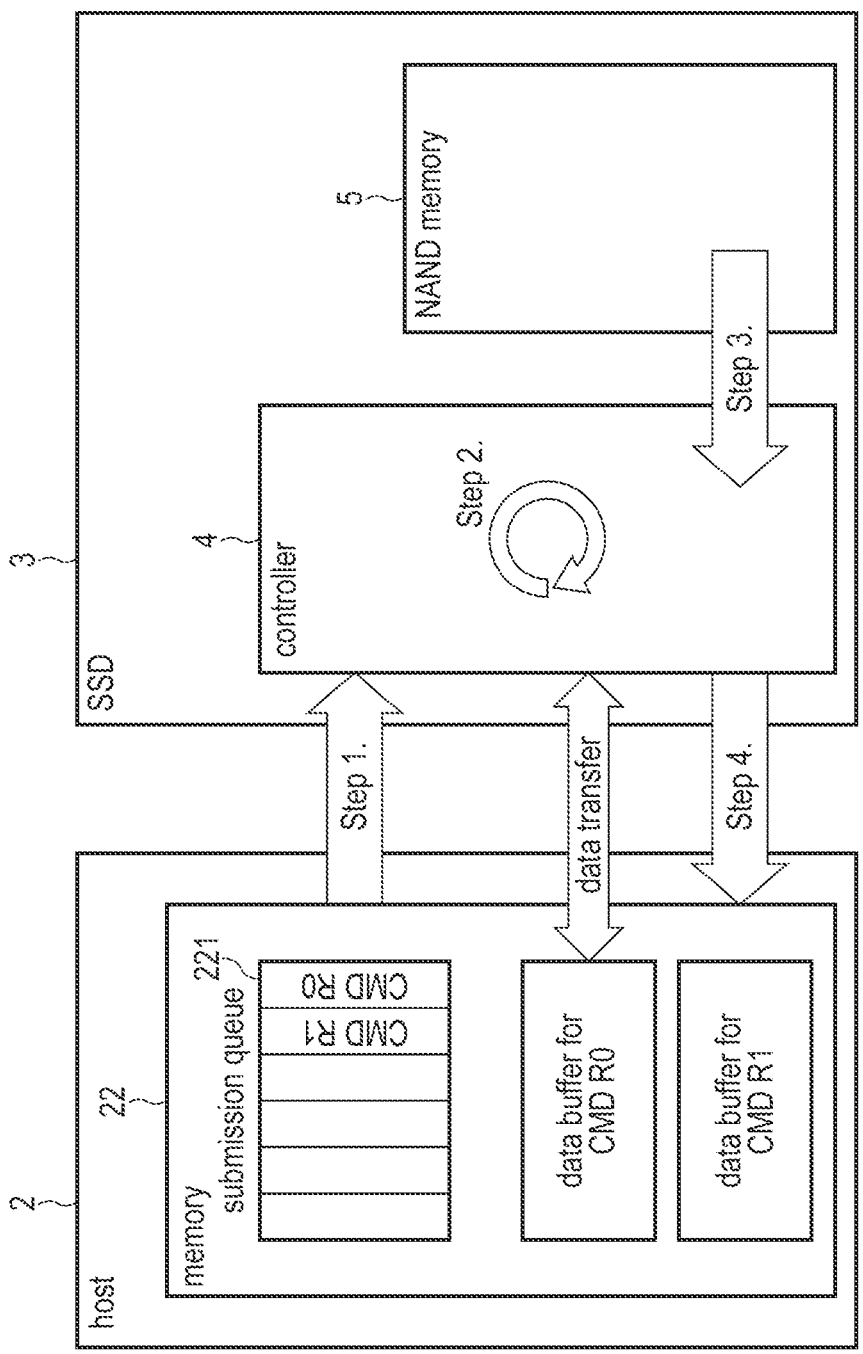
FIG. 4 is a diagram illustrating an example of use of data buffers in a memory of a host while processes of read commands are executed in the memory system according to the embodiment.

The process of read commands according to the embodiment will be described with reference to FIG. 4 to FIG. 12. In these figures, each step including substantially the same process is indicated by the same step number. When steps including the same process are particularly distinguished from each other, different characters or numbers may be added to the ends of the same step numbers. FIG. 4 is a diagram illustrating an example of a use of the data buffers in the memory of the host while processes of read commands are executed in the memory system according to the embodiment.

First, the outline of the procedure of processing read commands issued by the host 2 is described. Two commands CMD R0 and CMD R1 stored in the submission queue (SQ) 221 are read commands.

(Step 1) The controller 4 fetches the read command CMD R0 from the submission queue (SQ) 221 of the memory 22. The controller 4 decodes the fetched read command CMD R0.

(Step 2) The controller 4 executes a logical-to-physical address translation process for translating a logical address specified by the read command CMD R0 into a physical address.

(Step 3) The controller 4 reads read target data specified by the read command CMD R0 from a storage location of the NAND memory 5 indicated by the physical address obtained in the logical-to-physical address translation of step 2.

(Step 4) The controller 4 transfers the read target data which has been read from the NAND memory 5 in step 3 to a data buffer for the read command CMD R0 in the memory 22. The data buffer for the read command CMD R0 is a read command data buffer in the memory 22 indicated by a data pointer specified by the read command CMD R0.

The read command CMD R1 is processed in a manner similar to that of the read command CMD R0.

Thus, each read command data buffer is a storage location in which no data is stored until the read target data is transferred in step 4. Therefore, the controller 4 can write (transfer) management data of the SSD 3 to each read command data buffer. The controller 4 reads the management data of the SSD 3 from each read command data buffer. The management data of the SSD 3 is, for example, address translation information evicted from the LUT cache 61. In other words, the controller 4 accesses each read command data buffer for data writing a plurality of times.

Figure 5:
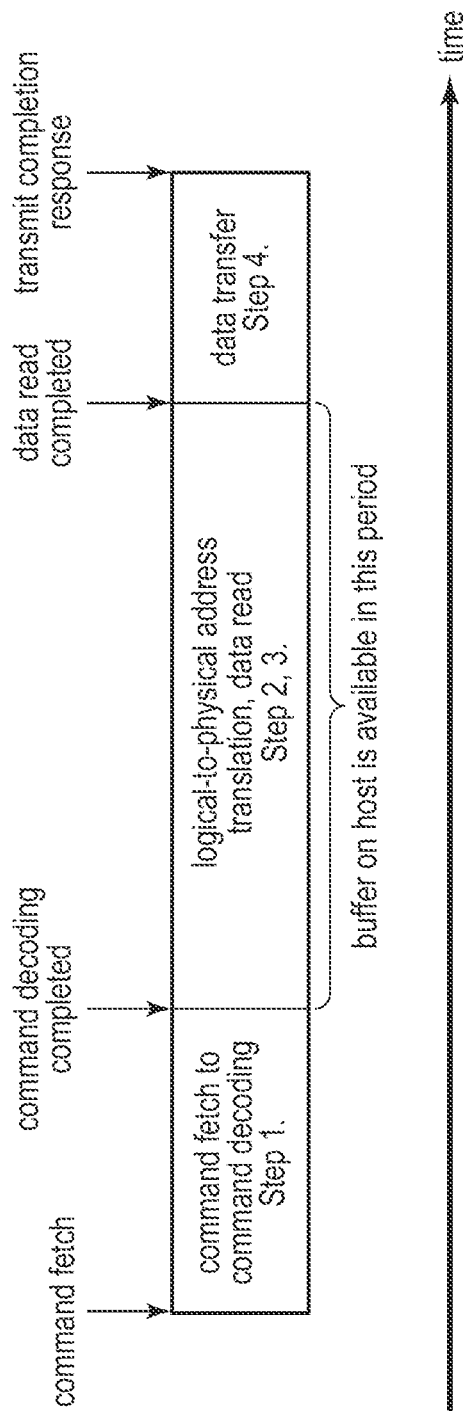
FIG. 5 is a diagram illustrating a relationship between a process of a read command executed in the memory system according to the embodiment and an available period of a data buffer in the memory of the host.

Next, a period in which a read command data buffer is available for storing management data will be described. FIG. 5 is a diagram illustrating the relationship between the process of a read command executed in the memory system according to the embodiment and the available period of the data buffer in the memory of the host.

The controller 4 decodes a read command after fetching the read command in step 1. The controller 4 obtains a data pointer indicating a storage area corresponding to a read command data buffer 223 by decoding the read command. The controller 4 can access the read command data buffer 223 in the memory 2 of the host 2 by using the obtained data pointer. Thus, after the decoding of the read command is completed, the controller 4 can use the read command data buffer 223 corresponding to the read command. In other words, until the decoding of the read command is completed, the controller 4 cannot use the read command data buffer 223 corresponding to the read command.

Next, the controller 4 executes logical-to-physical address translation and reading of the read target data in steps 2 and 3. Until the read target data is read, the controller 4 cannot transfer the read target data to the read command data buffer 223, and further, the controller 4 recognizes the storage area corresponding to the read command data buffer 223. Thus, the controller 4 can use the read command data buffer 223.

Next, in response to the reading of the read target data is completed, the controller 4 starts transferring of the read target data in step 4. Thus, the controller 4 cannot use the read command data buffer 223 on the memory 22 of the host 2 to store management data.

In other words, the controller 4 can use the read command data buffer 223 corresponding to the read command in which the processes of steps 2 or 3 are in progress to transfer data other than the read target data. Also, the controller 4 can read data other than the read target data from the read command data buffer 223 corresponding to the read command in which the processes of steps 2 and 3 are in progress. The read command in which the processes of steps 2 or 3 are in progress is the read command which is in process.

Figure 6:
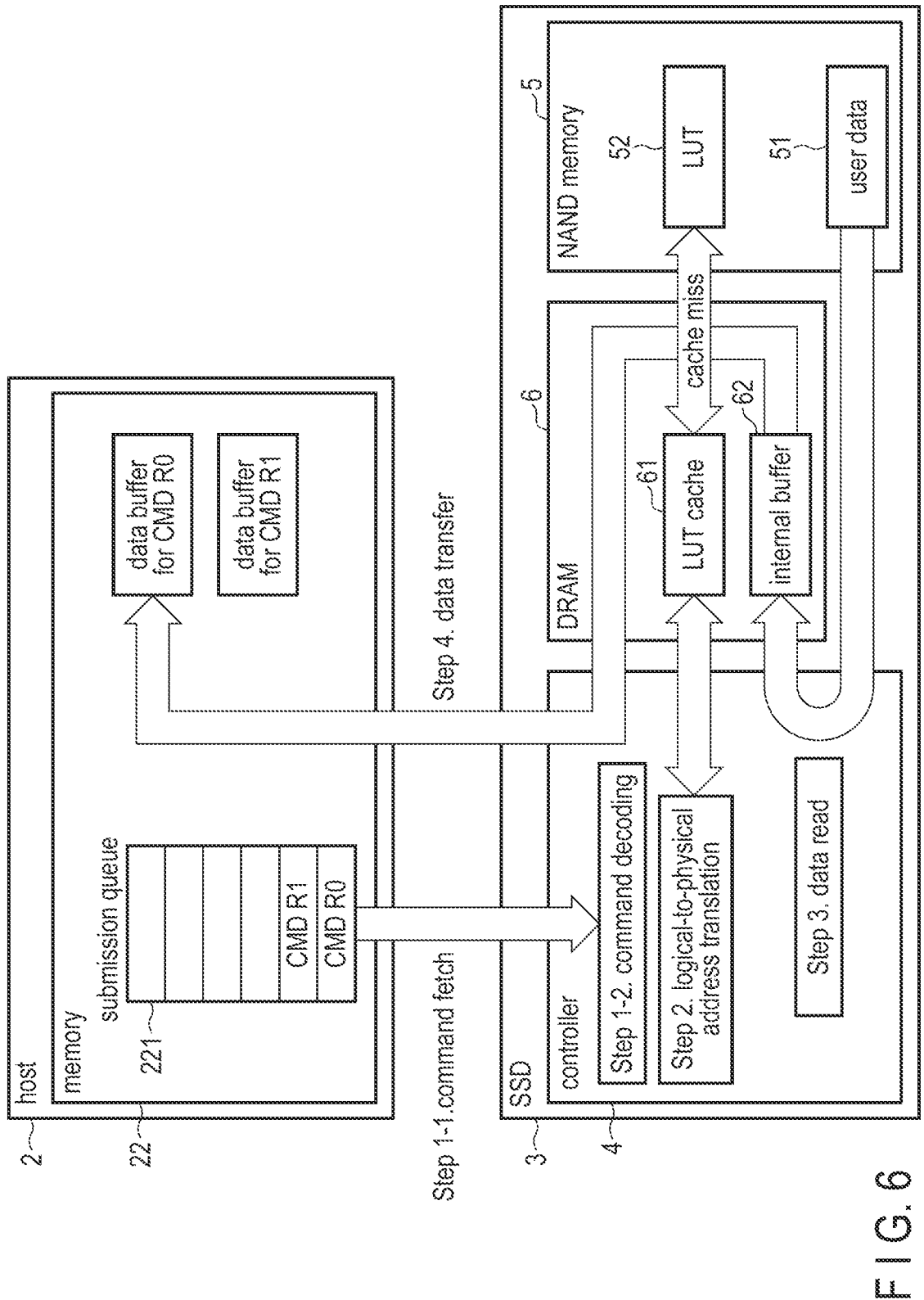
FIG. 6 is a diagram illustrating the process of read commands executed in the memory system according to the embodiment.

Next, a process of consecutive read commands will be described. FIG. 6 is a diagram illustrating the process of read commands executed in the memory system according to the embodiment. Here, the host 2 allocates the data buffer for the read command CMD R0 in the memory 22 and stores the read command CMD R0 in the submission queue (SQ) 221. The host 2 allocates the data buffer for the read command CMD R1 in the memory 22 and stores the read command CMD R1 in the submission queue (SQ) 221.

(Step 1-1) First, the controller 4 fetches the read command CMD R0 from the submission queue (SQ) 221.

(Step 1-2) The controller 4 decodes the read command CMD R0 fetched in step 1-1. By decoding the read command CMD R0, the controller 4 obtains the logical address specified by the read command CMD R0, the size of read target data, and a data pointer indicating the storage area corresponding to the data buffer 223 for the read command CMD R0.

(Step 2) The controller 4 executes logical-to-physical address translation for the logical address obtained in step 1-2. In the logical-to-physical address translation, the controller 4 refers to the LUT cache management table 612 (see FIG. 3) to obtain address translation information corresponding to the logical address obtained in step 1-2. When the address translation information to be obtained is stored in the LUT cache body 611 (see FIG. 3), the controller 4 reads the address translation information from the LUT cache body 611. The controller 4 executes the logical-to-physical address translation by using the read address translation information.

When the address translation information to be obtained is not stored in the LUT cache body 611, the controller 4 reads the address translation information from the LUT 52 in the NAND memory 5. The controller 4 executes the logical-to-physical address translation by using the read address translation information. The controller 4 obtains a physical address corresponding to the logical address specified by the read command CMD R0 by the logical-to-physical address translation. When the LUT cache 61 has a storage location in which new address translation information can be stored, the controller 4 stores the address translation information read from the LUT 52 into the LUT cache body 611.

When the LUT cache body 611 does not have any storage location in which new address translation information can be stored, the controller 4 determines eviction target address translation information from the address translation information stored in the LUT cache body 611. The controller 41 stores the address translation information read from the LUT 52 into the LUT cache body 611 instead of the eviction target address translation information.

(Step 3) The controller 4 reads the read target data from a storage location in the NAND memory indicated by the physical address obtained in step 2. The controller 4 temporarily stores the read target data which has been read into the internal buffer 62 of the DRAM 6.

(Step 4) The controller 4 transfers the read target data which is temporarily stored in the internal buffer 62 in step 3 to the data buffer for the read command CMD R0 in the memory 22.

Thus, the process of the read command CMD R0 is completed. The controller 4 executes the process for the read command CMD R1 in a similar manner. The controller 4 may start command fetch for the read command CMD R1 before the completion of the process for the read command CMD R0.

Figure 7:
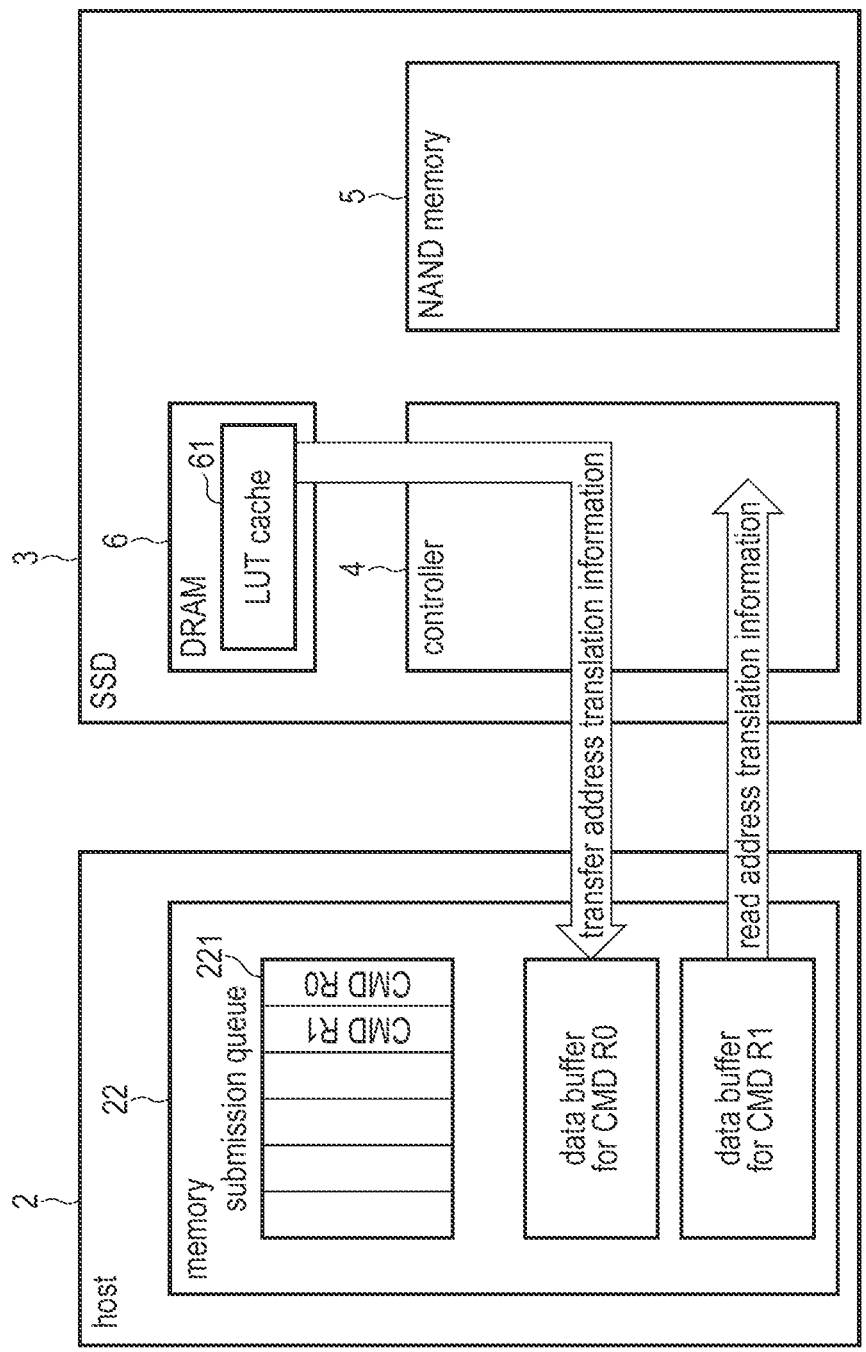
FIG. 7 is a diagram illustrating an example of a write process and a read process of address translation information executed in the memory system according to the embodiment.

Next, writing (transfer) of address translation information to a read command data buffer 223 and reading of address translation information from a read command data buffer 223 will be described. FIG. 7 is a diagram illustrating an example of a write process and a read process of address translation information executed in the memory system according to the embodiment.

Here, a case where the read command CMD R0 and the read command CMD R1 are in process in the controller 4 of the SSD 3 is assumed.

The controller 4 writes data other than the read target data to the data buffer for the read command CMD R0 that corresponds to the read command CMD R0 received from the host 2. The data other than the read target data is, for example, address translation information stored in the LUT cache body 611 or management data which is used for management of the SSD 3. When the read target data corresponding to the read command CMD R0 has been read from the NAND memory 5 while the process of the read command CMD R0 progresses, the controller 4 writes the read target data to the data buffer for the read command CMD R0.

For example, the controller 4 reads data other than the read target data from the data buffer for the read command CMD R1 corresponding to the read command CMD R1 received from the host 2.

The controller 4 writes (transfers) address translation information determined as the eviction target address translation information from the LUT cache body 611 to the data buffer for the read command CMD R0.

When the address translation information stored in the data buffer for the read command CMD R1 is hit in logical-to-physical address translation, the controller 4 reads the address translation information from the data buffer for the read command CMD R1 in the memory 22.

Figure 8:
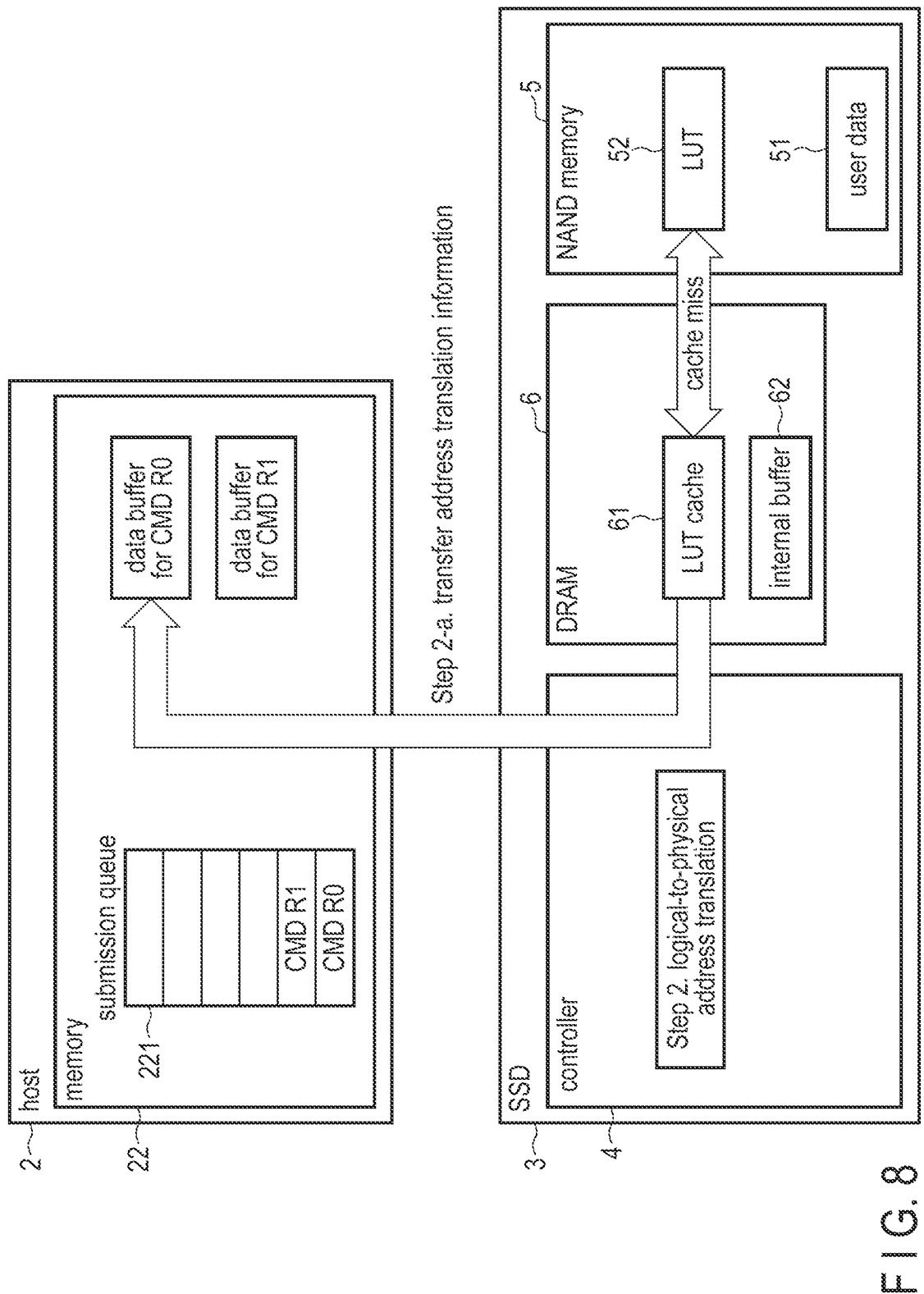
FIG. 8 is a diagram illustrating the write process of address translation information executed in the memory system according to the embodiment.

Next, a case where address translation information is evicted from the LUT cache 61 and written to a data buffer for read data in the process of the read command CMD R1 will be described. FIG. 8 is a diagram illustrating a write process of address translation information executed in the memory system according to the embodiment. In FIG. 8, it is assumed that reading of the read target data specified by the read command CMD R0 is not completed after decoding for the read command CMD R0 is completed.

The controller 4 fetches the read command CMD R1 following the read command CMD R0 and decodes the read command CMD R1.

(Step 2) The controller 4 executes logical-to-physical address translation for the logical address specified by the read command CMD R1. The controller 4 determines whether or not address translation information corresponding to the logical address specified by the read command CMD R1 is managed by the LUT cache management table 612. When address translation information corresponding to the logical address specified by the read command CMD R1 is not managed by the LUT cache management table 612 (cache miss), the controller 4 determines whether or not the LUT cache body 611 has a storage location which is available for storing new address translation information. When the LUT cache body 611 does not have any storage location which is available for storing new address translation information, the controller 4 selects eviction target address translation information from the pieces of address translation information stored in the LUT cache body 611. The controller 4 selects the eviction target address translation information from the pieces of address translation information which are stored in the LUT cache body 611 and are not dirty. The controller 4 determines whether or not a storage location which is available for storing address translation information is present in the storage area on the memory 22 indicated by the data pointer specified by the read command which is in process. Here, the read command which is in process is each of the read command CMD R0 and the read command CMD R1. Thus, the controller 4 determines whether or not a storage location in which the eviction target address translation information can be stored is present in the data buffer for the read command CMD R0 and the data buffer for the read command CMD R1.

(Step 2-a) When a storage location in which the eviction target address translation information can be stored is present in the data buffer for the read command CMD R0 or the data buffer for the read command CMD R1, the controller 4 writes (transfers) the eviction target address translation information to the memory 22. Here, the controller 4 writes (transfers) the eviction target address translation information to the data buffer for the read command CMD R0. The controller 4 updates a pointer in the LUT cache management table 612 corresponding to the eviction target address translation information so as to be information indicating the data buffer for the read command CMD R0.

Figure 9:
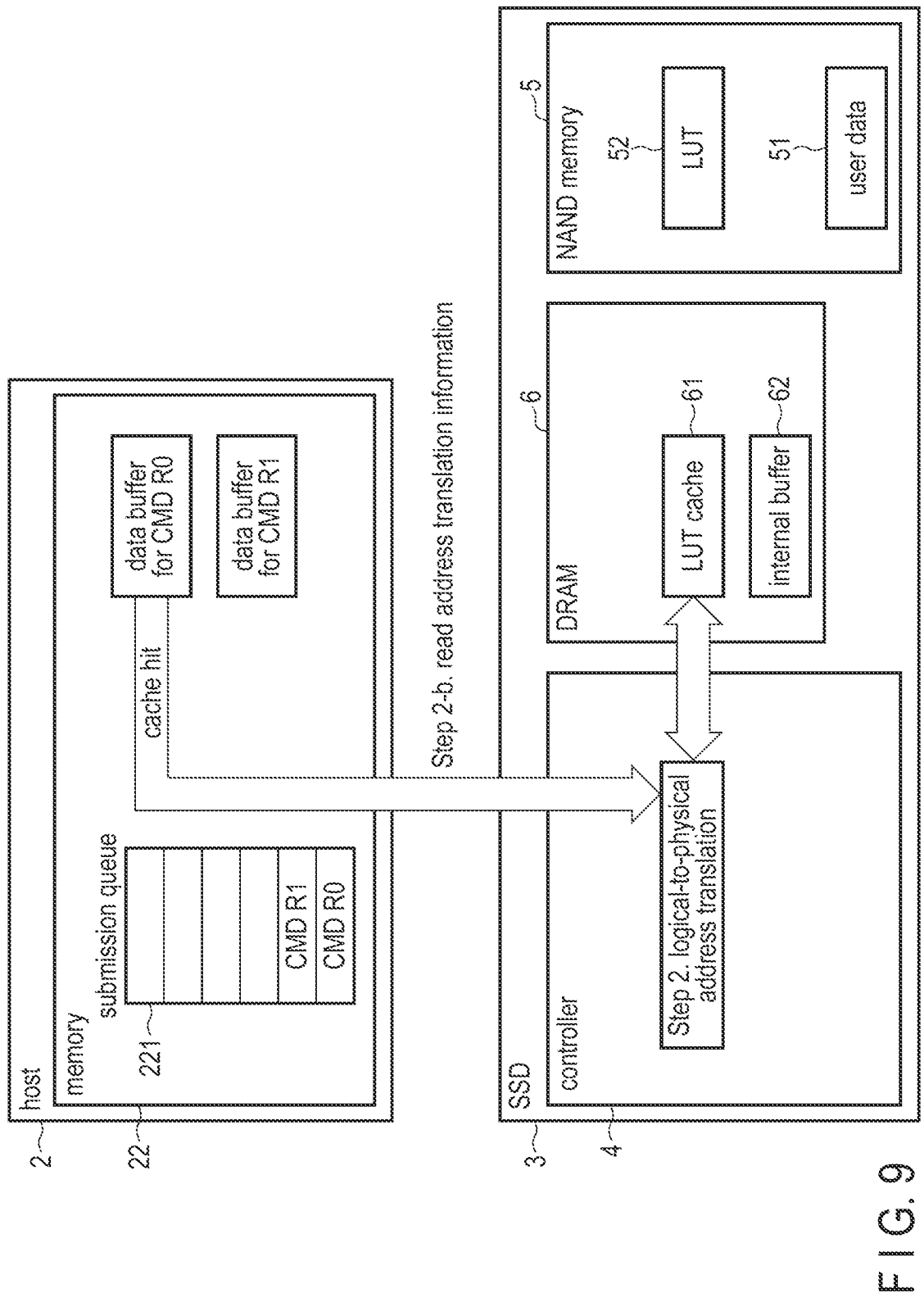
FIG. 9 is a diagram illustrating the read process of address translation information executed in the memory system according to the embodiment.

Next, a case where a cache hit occurs in the address translation information stored in the data buffer for the read command CMD R0 in the process of the read command CMD R1 will be described. FIG. 9 is a diagram illustrating a read process of address translation information executed in the memory system according to the embodiment. In FIG. 9, it is assumed that, when decoding for the read command CMD R0 is completed, reading of the read target data specified by the read command CMD R0 is not completed, and further, address translation information corresponding to the logical address specified by the read command CMD R1 is stored in the data buffer for the read command CMD R0.

The controller 4 fetches the read command CMD R1 following the read command CMD R0 and decodes the read command CMD R1.

(Step 2) The controller 4 executes logical-to-physical address translation for the logical address specified by the read command CMD R1. The controller 4 determines whether or not address translation information corresponding to the logical address specified by the read command CMD R1 is managed by the LUT cache management table 612. When address translation information corresponding to the logical address specified by the read command CMD R1 is managed in the LUT cache management table 612, the controller 4 obtains a pointer indicating a storage location in which the address translation information corresponding to the logical address specified by the read command CMD R1 is stored. When the address translation information corresponding to the logical address specified by the read command CMD R1 is stored in the data buffer for the read command CMD R0, the controller 4 obtains the pointer indicating the storage location in the data buffer for the read command CMD R0.

(Step 2-b) The controller 4 reads the address translation information from the read command data buffer of the memory 22 by using the pointer obtained in step 2. The controller 4 reads the address translation information stored in the data buffer for the read command CMD R0.

The controller 4 translates the logical address specified by the read command CMD R1 into a physical address by using the address translation information read in step 2-b.

Next, transferring of read target data to the read command data buffer 223 will be described. FIG. 10 is a diagram illustrating an overwrite process and a copy process of address translation information executed in the memory system according to the embodiment. Here, it is assumed that address translation information is stored in the data buffer for the read command CMD R0 on the memory 22.

When the operation of reading, from the NAND memory 5, the read target data specified by the read command CMD R0 is completed, the controller 4 executes a data transfer process based on a first method or a second method described below.

First, a case where the controller 4 executes the data transfer process based on the first method is described. In the first method, when the operation of reading the read target data specified by the read command CMD R0 from the NAND memory 5 is completed, the controller 4 starts a process of transferring the read target data to the data buffer for the read command CMD R0. This causes the address translation information stored in the data buffer for the read command CMD R0 to be overwritten with the read target data. In other words, the controller 4 replaces the address translation information stored in the data buffer for the read command CMD R0 with the read target data.

Next, a case where the controller 4 executes the data transfer process based on the second method is described. In the second method, when the operation of reading the read target data specified by the read command CMD R0 from the NAND memory 5 is completed, the controller 4 determines whether or not a storage location in which new address translation information can be stored is present in the data buffer for the read command CMD R1. Here, the read command CMD R1 is a read command which is in process. When a storage location in which new address translation information can be stored is present in the data buffer for the read command CMD R1, the controller 4 reads the address translation information stored in the data buffer for the read command CMD R0. The controller 4 copies the address translation information stored in the data buffer for the read command CMD R0 by writing the read address translation information to the data buffer for the read command CMD R1. Subsequently, the controller 4 transfers the read target data specified by the read command CMD R0 to the data buffer for the read command CMD R0.

Figure 11:
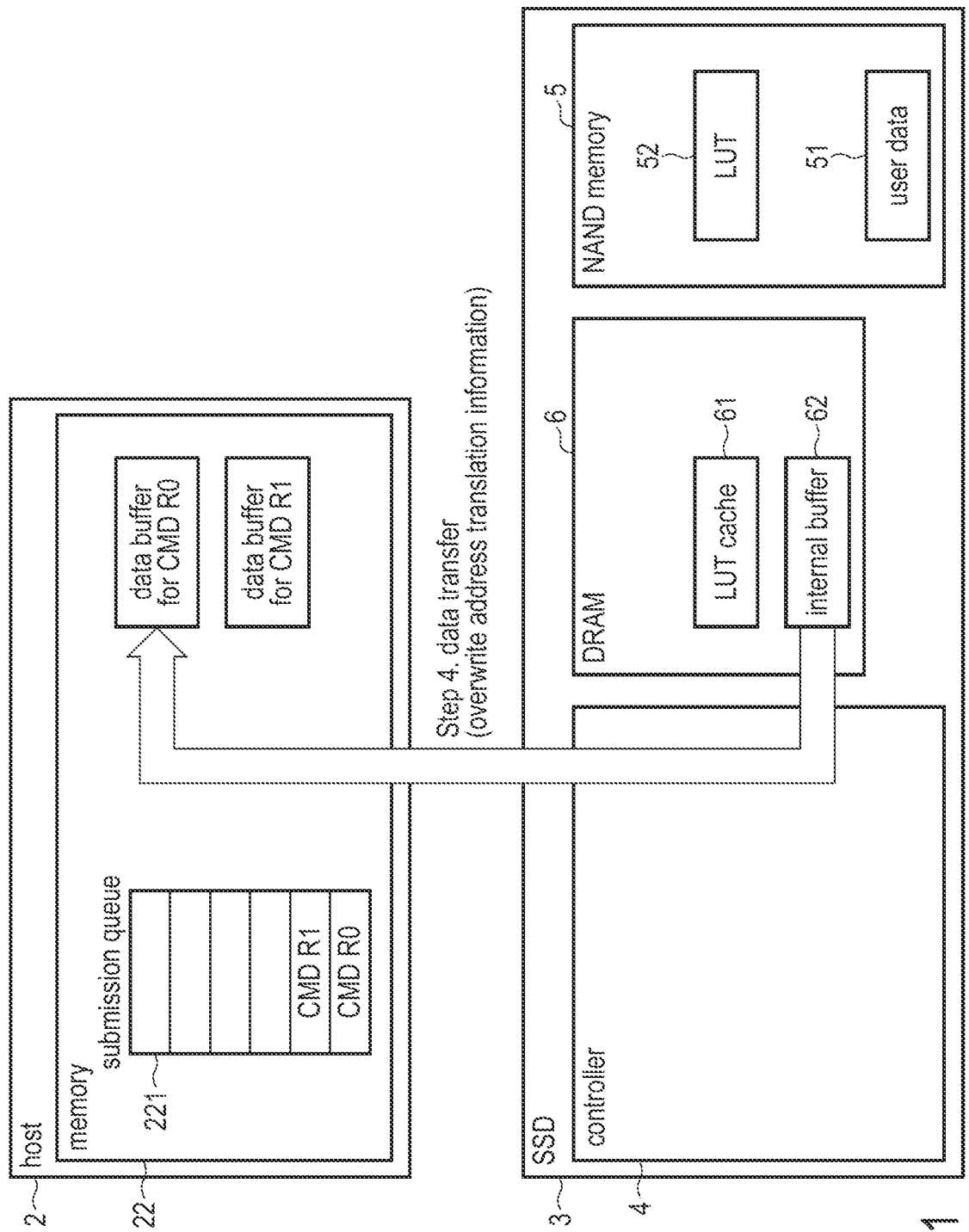
FIG. 11 is a diagram illustrating the overwrite process of address translation information executed in the memory system according to the embodiment.

Next, the process of transferring the read target data specified by the read command CMD R0 to the memory 22, based on the first method will be described. FIG. 11 is a diagram illustrating the overwrite process of address translation information executed in the memory system according to the embodiment.

(Step 4) In response to the read target data specified by the read command CMD R0 having been stored in the internal buffer 62, the controller 4 transfers the read target data to the data buffer for the read command CMD R0. This causes, when address translation information is stored in the data buffer for the read command CMD R0, the address translation information to be replaced with the read target data. In other words, the address translation information stored in the data buffer for the read command CMD R0 is overwritten with the read target data. The controller 4 discards management information in the LUT cache management table 612 related to the overwritten address translation information.

This causes the address translation information stored in the data buffer for the read command CMD R0 to be erased. As the eviction target address translation information is selected from pieces of address translation information which are not dirty, the controller 4 does not need to execute a write back process for the address translation information stored in the data buffer for the read command CMD R0.

Figure 12:
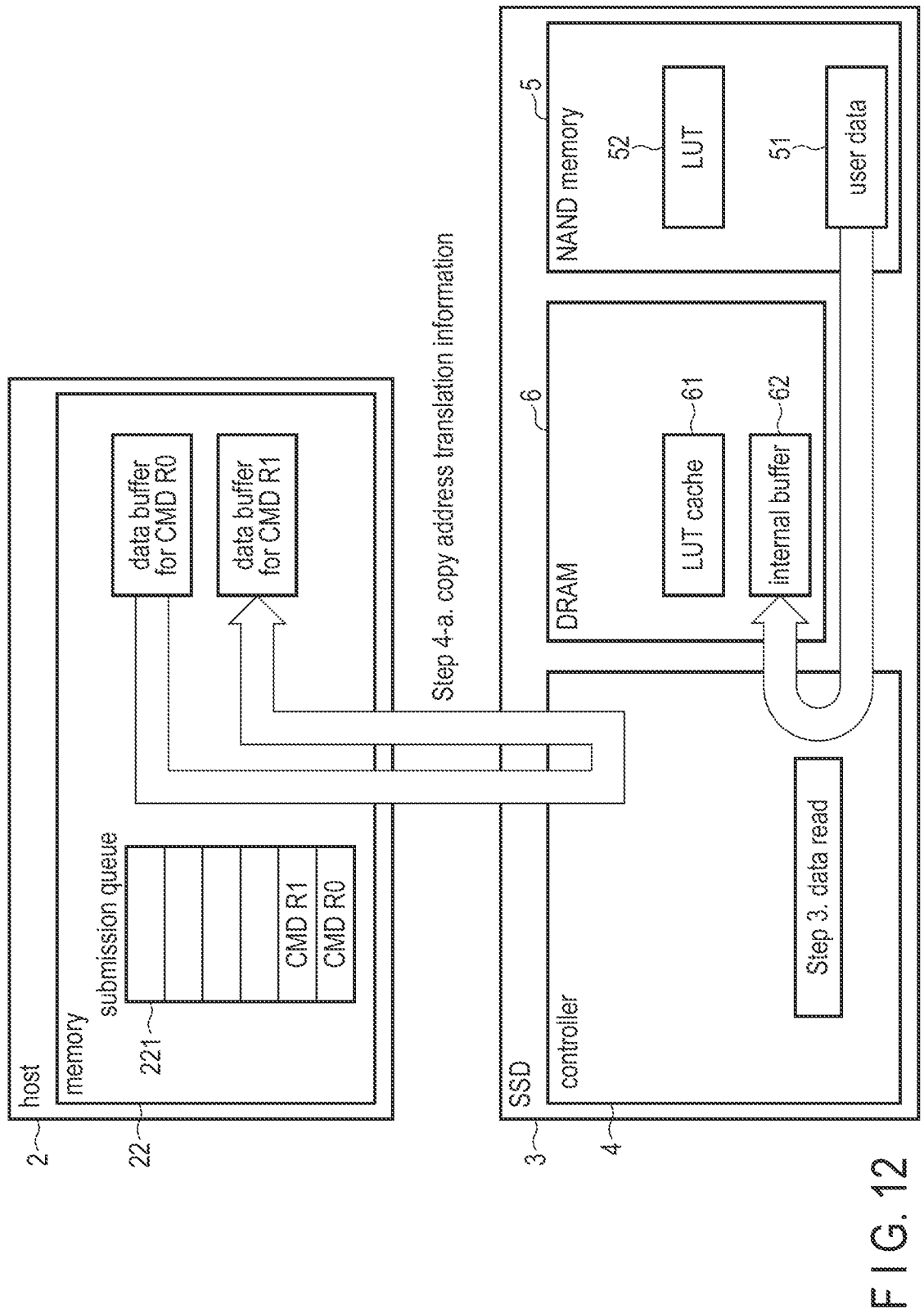
FIG. 12 is a diagram illustrating the copy process of address translation information executed in the memory system according to the embodiment.

Next, on the basis of the second method, the details of the process of transferring the read target data specified by the read command CMD R0 to the memory 22 will be described. FIG. 12 is a diagram illustrating the copy process of address translation information executed in the memory system according to the embodiment. Here, it is assumed that address translation information is stored in the data buffer for the read command CMD R0 on the memory 22, and further, a storage location in which new address translation information can be stored is present in the data buffer for the read command CMD R1.

(Step 3) In response to the logical-to-physical address translation for the logical address specified by read command CMD R0 is completed, the controller 4 reads the read target data specified by read command CMD R0 from the NAND memory 5. The controller 4 stores the read target data which has been read in the internal buffer 62 of the DRAM 6.

(Step 4-a) In response to the read target data specified by the read command CMD R0 having been stored in the internal buffer 62 in step 3, the controller 4 reads the address translation information stored in the data buffer for the read command CMD R0 on the memory 22. The controller 4 writes (transfers) the read address translation information to the data buffer for the read command CMD R1. In other words, the controller 4 copies the address translation information stored in the data buffer for the read command CMD R0 to the data buffer for read command CMD R1. The controller 4 updates the management information of the address translation information stored in the LUT cache management table 612.

In this way, as the read target data specified by the read command CMD R0 is transferred to the data buffer for the read command CMD R0, the address translation information stored in the data buffer for the read command CMD R0 is not overwritten and is continuously used as cached address translation information.

Whether the process of transferring the read target data specified by the read command CMD R0 to the memory 22 should be executed by the first method or the second method may be determined on the basis of any criterion. For example, when the process of writing address translation information to a read command data buffer is mounted in a simplified manner, the first method is selected. For example, when a read command data buffer should be used long as a temporary storage area of address translation information, the second method is selected.

Figure 13:
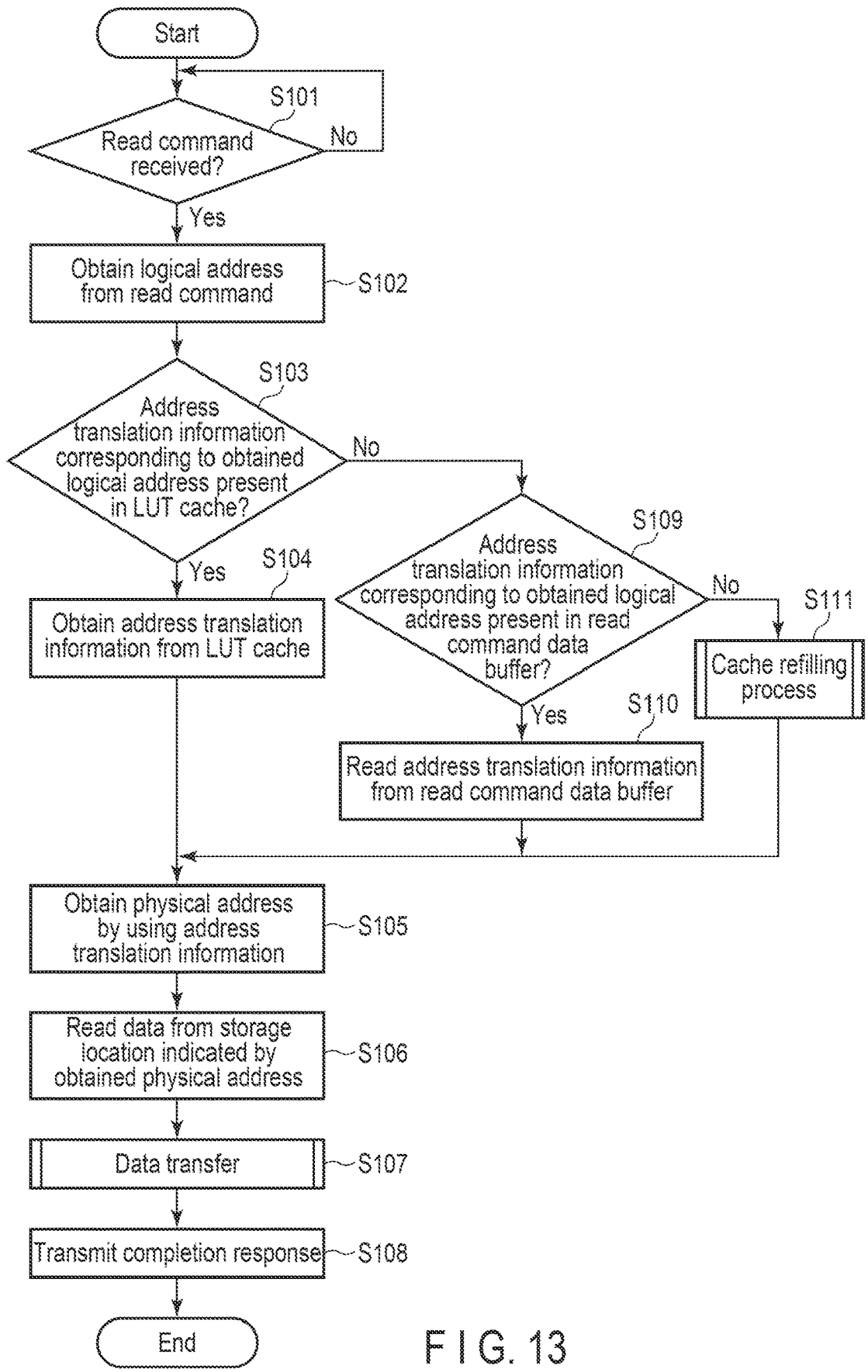
FIG. 13 is a flowchart illustrating the procedure of the process of a read command executed in the memory system according to the embodiment.

Next, the procedure of the process of a read command will be described. FIG. 13 is a flowchart illustrating the procedure of the process of a read command executed in the memory system according to the embodiment.

The controller 4 determines whether or not the SSD 3 has received a read command (step S101).

When no read command has been received (No in step S101), the controller 4 waits until a read command is received.

When a read command has been received (Yes in step S101), the controller 4 decodes the received read command and obtains a logical address from the decoded read command (step S102). The logical address is a logical address corresponding to read target data.

The controller 4 determines whether or not address translation information corresponding to the logical address obtained in step S102 is stored in the LUT cache 61 (step S103).

When the address translation information is stored in the LUT cache 61 (Yes in step S103), the controller 4 obtains the address translation information from the LUT cache 61 (step S104).

The controller 4 obtains a physical address by using the address translation information obtained in step S104 (step S105).

The controller 4 reads the read target data from a storage location of the NAND memory 5 indicated by the physical address obtained in step S105 (step S106). The controller 4 stores the read target data which has been read in the internal buffer 62.

The controller 4 executes data transfer for transferring the read target data which has been read in step S106 to the read command data buffer 223 of the memory 22 (step S107). The details of the data transfer are described later with reference to FIG. 15.

The controller 4 transmits a completion response of the read command to the host 2 (step S108).

When the address translation information is not stored in the LUT cache 61 (No in step S103), the controller 4 determines whether or not address translation information corresponding to the logical address obtained in step S102 is stored in the read command data buffer 223 of the memory 22 (step S109). For example, the controller 4 refers to the LUT cache management table 612 of the LUT cache 61.

When the address translation information is stored in the read command data buffer 223 of the memory 22 (Yes in step S109), the controller 4 reads the address translation information from the read command data buffer 223 of the memory 22 (step S110).

The controller 4 executes the processes of steps S105 to S108 by using the address translation information obtained in step S110.

When the address translation information is not stored in the read command data buffer 223 of the memory 22 (No in step S109), the controller 4 executes a cache refilling process (step S111). The details of the cache refilling process are described later with reference to FIG. 14. By the cache refilling process of step S111, the controller 4 obtains the address translation information from the NAND memory 5.

The controller 4 executes the processes of steps S105 to S108 by using the address translation information obtained in step S111.

Figure 14:
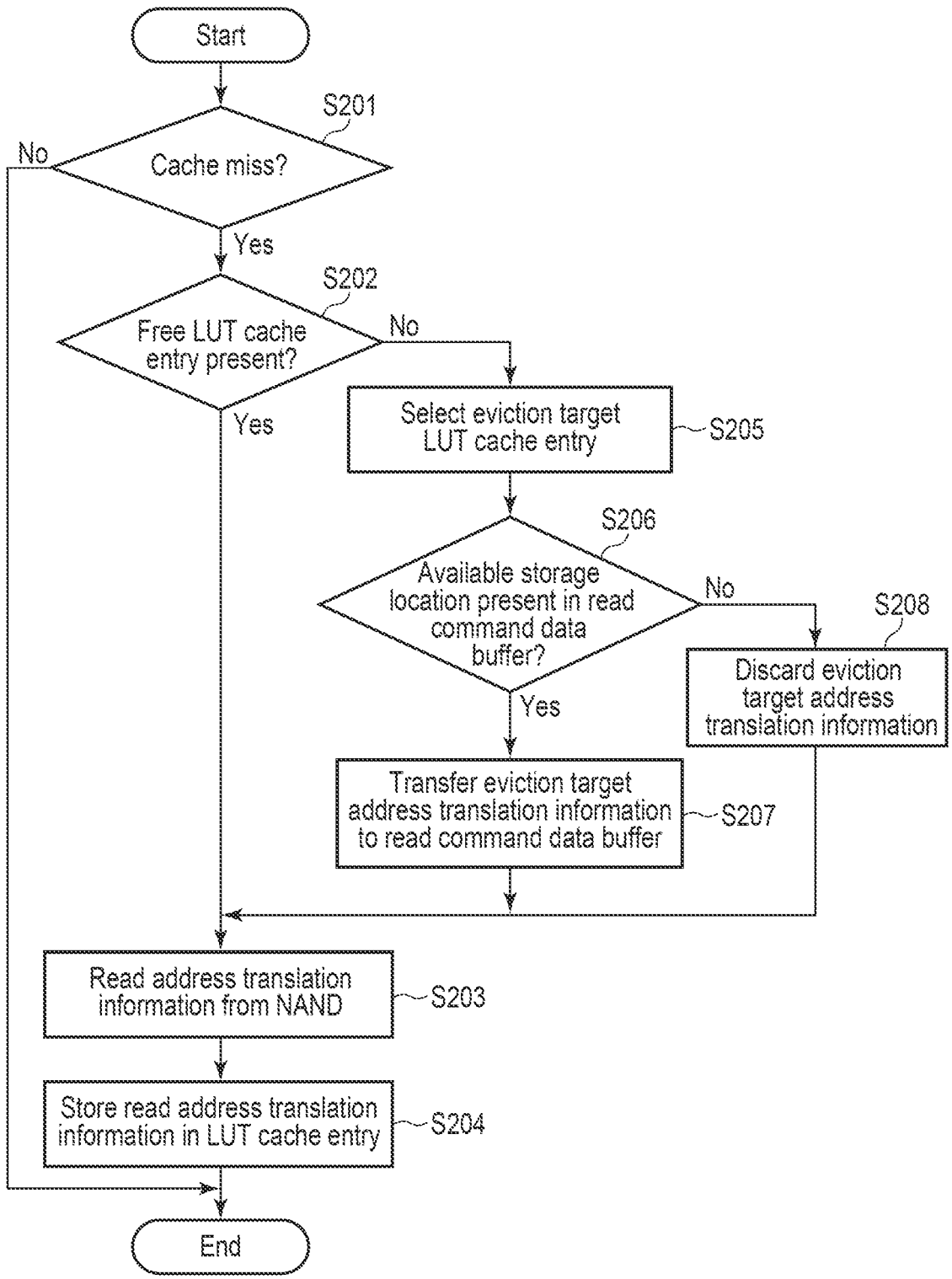
FIG. 14 is a flowchart illustrating the procedure of a cache refilling process executed in the memory system according to the embodiment.

Next, the cache refilling process in step S111 will be described. FIG. 14 is a flowchart illustrating a cache refilling process executed in the memory system according to the embodiment.

First, the controller 4 determines whether or not a cache miss occurs (step S201).

When no cache miss occurs (No in step S201), the controller 4 ends the cache refilling process.

When the cache miss occurs (Yes in step S201), the controller 4 determines whether or not the LUT cache 61 (more specifically, the LUT cache body 611) has a free entry (step S202). The free entry is a storage location in which new address translation information can be stored.

When the LUT cache 61 has a free entry (Yes in step S202), the controller 4 reads address translation information from the NAND memory 5 (step S203).

The controller 4 stores the address translation information read in step S203 in the free entry of the LUT cache 61 (step S204).

When the LUT cache 61 does not have any free entry (No in step S202), the controller 4 selects an eviction target LUT cache entry from LUT cache entries corresponding to the address translation information which is stored in the LUT cache 61 and is not dirty (step S205). Address translation information corresponding to the eviction target LUT cache entry is also called eviction target address translation information.

The controller 4 determines whether or not a read command data buffer 223 corresponding to a read command which is in process has an available storage location in which new address translation information can be stored (step S206).

When the read command data buffer 223 has an available storage location (Yes in step S206), the controller 4 writes (transfers) the eviction target address translation information selected in step S205 to the read command data buffer 223 of the memory 22 (step S207).

The controller 4 executes the processes of steps S203 and S204. At this time, the controller 4 stores the address translation information read in step S203 in the LUT cache entry selected as the eviction target in step S205.

When the read command data buffer 223 does not have any available storage location (No in step S206), the controller 4 discards the eviction target address translation information selected in step S205 from the LUT cache entry (step S208).

The controller 4 executes the processes of steps S203 and S204. At this time, the controller 4 stores the address translation information read in step S203 in the LUT cache entry selected as the eviction target LUT cache entry in step S205.

Next, the process of data transfer will be described. FIG. 15 is a flowchart illustrating the procedure of the process of data transfer executed in the memory system according to the embodiment.

First, the controller 4 determines whether or not address translation information is stored in the read command data buffer 223 which is the storage area to which read data is to be transferred (step S301).

When address translation information is not stored in the read command data buffer 223 (No in step S301), the controller 4 writes the read data to the read command data buffer 223 (step S303). When address translation information is stored in the read command data buffer 223 (Yes in step S301), the controller 4 determines whether a data transfer process should be executed on the basis of the first method or the second method (step S302).

When the controller 4 executes a data transfer process on the basis of the first method (the first method in step S302), the controller 4 writes the read target data to the read command data buffer 223 of the memory 22 (step S303). This causes the controller 4 to overwrite the address translation information stored in the read command data buffer 223.

When the controller 4 executes a data transfer process on the basis of the second method (the second method in step S302), the controller 4 determines whether or not another read command data buffer 223 has an available storage location (step S304). The available storage location is a storage location in which new address translation information can be stored.

When another read command data buffer 223 does not have any available storage location (No in step S304), the controller 4 writes the read target data to the read command data buffer 223 of the memory 22 (step S303). This causes the controller 4 to overwrite the address translation information stored in the read command data buffer 223.

When another read command data buffer 223 has an available storage location (Yes in step S304), the controller 4 reads address translation information from the read command data buffer 223 of the memory 22 (step S305).

The controller 4 writes (transfers) the address translation information read in step S305 to another read command data buffer (step S306). This causes the address translation information stored in the read command buffer to be copied.

The controller 4 writes the read target data which has been read to the read command data buffer 223 (step S303).

In this way, the controller 4 executes the processes of steps S207 and S303. Thus, in response to a read command having been received by the SSD 3, the controller 4 may execute the access for data write twice or more times for the read command data buffer 223 of the memory 22 indicated by the data pointer specified by the received read command. The size of the read command data buffer 223 corresponding to one read command is equivalent to the size of the read target data. In general, the size of the read target data is greater than the size of one piece of address translation information. In this case, such that a plurality of pieces of address translation information are stored in one read command data buffer 223, the controller 4 may execute the access for data write for transferring eviction target address translation information to the read command data buffer 223 twice or more times.

As explained above, in the present embodiment, the controller 4 can use a read command data buffer 223 corresponding to a read command which is in process. The controller 4 executes read access to the read command data buffer 223 and reads data different from the read target data. The data different from the read target data is, for example, target address translation information for address translation process.

The controller 4 writes management data used for management of the SSD 3 to the read command data buffer 223, reads the read target data from the NAND memory 5 and writes the read target data read from the NAND memory 5 to the read command data buffer 223. The management data is, for example, address translation information.

Thus, the controller 4 temporarily uses the read command data buffer 223 in a period from the completion of the decoding of the read command until the read target data is transferred to the read command data buffer 223. The controller 4 can effectively use the read command data buffer 223 which is a storage area which is not used until the read target data is transferred.

By this configuration, without increasing the sizes of the volatile memories (the DRAM 6 and the SRAM 44) of the SSD 3, the sizes of volatile memories which can be used by the controller 4 can be increased. The controller 4 can read data from the memory 22 of the host 2 at a time shorter than the time required to read data from the NAND memory 5. Thus, by using the read command data buffer 223, the controller 4 can prevent the generation of extra latency.

At this time, the controller 4 can read address translation information from the read command data buffer 223 of the memory 22 instead of reading the address translation information from the LUT 52 in the NAND memory 5. Thus, the controller 4 can use the read command data buffer 223 as an LUT cache.

One of the techniques in which the SSD 3 uses the memory 22 of the host 2 is a host memory buffer which is defined in the NVMe standard. The host memory buffer is part of the memory 22 allocated to the SSD 3 as the dedicated storage area for the SSD 3 by the host 2. However, the size of the host memory buffer allocated to the SSD 3 is determined by the host 2. Thus, the size required for the SSD 3 is not guaranteed. In addition, the storage area allocated to the SSD 3 as the host memory buffer is exclusively used by the SSD 3 and cannot be used by the host 2. Thus, when the host memory buffer is allocated to the SSD 3, the memory size which can be used by the host 2 is decreased. The read command data buffer is not used as the dedicated storage area for the SSD 3, which is different from the host memory buffer allocated as the dedicated storage area for the SSD 3. Thus, in the present embodiment, the storage area of the memory 22 can be used as an LUT cache, etc., without affecting the size of the storage area of the memory 22 which can be used by the host 2.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system that is connectable to a host, the memory system comprising:
   a nonvolatile memory; and
   a controller electrically connected to the nonvolatile memory and configured to control the nonvolatile memory, wherein
   the controller is configured to:
      receive, from the host, a first read command that specifies a first logical address and a data pointer, the first logical address corresponding to first data stored in the nonvolatile memory, the data pointer indicating a first data buffer of a memory of the host to which the first data is to be transferred;
      perform read access to the first data buffer of the memory of the host, based on the data pointer specified by the first read command;
      receive and decode the first read command;
      read the first data from the nonvolatile memory;
      in response to receiving, from the host, a second read command following the first read command in a period from the receiving and decoding of the first read command until the transferring the first data to the first data buffer is started, the second read command specifying a second logical address,
      determine whether second address translation information indicating a correspondence between the second logical address and a physical address of the nonvolatile memory is stored in the first data buffer; and
      in a case where the second address translation information is stored in the first data buffer, perform read access to the first data buffer and read the second address translation information from the first data buffer.

2. The memory system of claim 1, wherein
   the controller is configured to read, from the first data buffer, second data different from the first data.

3. The memory system of claim 2, wherein
   the second data is management data used for management of the memory system.

4. The memory system of claim 2, wherein
   the second data is address translation information indicating a correspondence between a logical address and a physical address of the nonvolatile memory.

5. The memory system of claim 1, wherein
   the controller is further configured to:
      receive and decode the first read command;
      read the first data from the nonvolatile memory;
      transfer the first data read from the nonvolatile memory to the first data buffer; and
      perform the read access to the first data buffer in a period from receiving and decoding of the first read command until transferring the first data to the first data buffer is started.

6. A memory system that is connectable to a host, the memory system comprising:
   a nonvolatile memory; and
   a controller electrically connected to the nonvolatile memory and configured to control the nonvolatile memory, wherein
   the controller is configured to:
      receive, from the host, a first read command that specifies a first logical address and a first data pointer, the first logical address corresponding to first data stored in the nonvolatile memory, the first data pointer indicating a first data buffer of a memory of the host to which the first data is to be transferred;
      write management data that is used for management of the memory system to the first data buffer of the memory of the host, based on the first data pointer specified by the first read command;
      read the first data from the nonvolatile memory;
      write the first data read from the nonvolatile memory to the first data buffer;
      before the first data is written to the first data buffer, read the management data stored in the first data buffer;
      write the read management data to a second data buffer of the memory of the host specified by the second read command; and
      write the first data to the first data buffer.

7. The memory system of claim 6, wherein
   the management data is address translation information indicating a correspondence between a logical address and a physical address of the nonvolatile memory.

8. The memory system of claim 7, wherein
   the controller is further configured to,
      in response to receiving, from the host, a second read command that specifies a second logical address and a second data pointer, the second logical address corresponding to second data stored in the nonvolatile memory, the second data pointer indicating a second data buffer of the memory of the host to which the second data to be transferred:
         search a plurality of pieces of address translation information that are stored in a volatile memory of the memory system or in the memory of the host, for second address translation information that corresponds to the second logical address specified by the second read command; and
         in a case where the second address translation information is stored in the first data buffer or the second data buffer, read the second address translation information from the first data buffer or the second data buffer.

9. The memory system of claim 8, wherein
   the controller is further configured to,
      in a case where the second address translation information is not stored in the volatile memory or the memory of the host, and further, the volatile memory does not have a storage location which is available for storing new address translation information:
         select eviction target address translation information from the plurality of pieces of address translation information that are stored in the volatile memory; and write the selected address translation information to the first data buffer or the second data buffer.

10. The memory system of claim 9, wherein
the controller is further configured to select the eviction target address translation information from one or more pieces of address translation information which are stored in the volatile memory and need not to be written back to the nonvolatile memory.

11. The memory system of claim 6, wherein
the controller is configured to replace the management data stored in the first data buffer with the first data by writing the first data to the first data buffer.

12. A memory system that is connectable to a host, the memory system comprising:
a nonvolatile memory; and
a controller electrically connected to the nonvolatile memory and configured to control the nonvolatile memory, wherein
the controller is configured to:
  receive, from the host, a first read command that specifies a first logical address and a first data pointer, the first logical address corresponding to first data stored in the nonvolatile memory, the first data pointer indicating a first data buffer of a memory of the host to which the first data is to be transferred;
  write address translation information to the first data buffer, based on the first data pointer specified by the first read command, the address translation information indicating a correspondence between a logical address and a physical address of the nonvolatile memory;
  read the first data from the nonvolatile memory;
  write the first data, which has been read from the nonvolatile memory, to the first data buffer;
  before the first data is written to the first data buffer, read the address translation information stored in the first data buffer;
  write the read address translation information to a second data buffer of the memory of the host specified by a second read command; and
  write the first data to the first data buffer.

13. The memory system of claim 12, wherein
the controller is further configured to:
  in response to receiving, from the host, a second read command that specifies a second logical address a second data pointer, the second logical address corresponding to second data stored in the nonvolatile memory, the second data pointer indicating a second data buffer of a memory of the host to which the second data to be transferred,
  search a plurality of pieces of address translation information that are stored in a volatile memory of the memory system or in the memory of the host, for second address translation information that corresponds to the second logical address specified by the second read command; and
  in a case where the second address translation information is stored in the first data buffer or the second data buffer,
  read the second address translation information from the first data buffer or the second data buffer.

14. The memory system of claim 13, wherein
the controller is further configured to,
  in a case where the second address translation information is not stored in the volatile memory or the memory of the host, and further, the volatile memory does not have a storage location which is available for storing new address translation information:
    select eviction target address translation information from the plurality of pieces of address translation information that are stored in the volatile memory; and
    write the selected address translation information to the first data buffer or the second data buffer.

15. The memory system of claim 14, wherein
the controller is further configured to select the eviction target address information from, of the plurality of pieces of address translation information that are stored in the volatile memory, address translation information which need not to be written back to the nonvolatile memory.

16. The memory system of claim 12, wherein
the controller is configured to replace the address translation information stored in the first data buffer with the first data.

17. A memory system that is connectable to a host, the memory system comprising:
a nonvolatile memory; and
a controller electrically connected to the nonvolatile memory and configured to control the nonvolatile memory, wherein
the controller is configured to:
  receive, from the host, a first read command that specifies a first logical address and a data pointer, the first logical address corresponding to first data stored in the nonvolatile memory, the data pointer indicating a first data buffer of a memory of the host to which the first data is to be transferred,
  perform write access to the first data buffer of the memory of the host twice or more times, based on the data pointer specified by the first read command,
  before the first data is written to the first data buffer, read the address translation information stored in the first data buffer,
  write the read address translation information to a second data buffer of the memory of the host specified by a second read command; and
  write the first data to the first data buffer.

* * * * *